US009635398B2

(12) United States Patent
Ionescu

(10) Patent No.: US 9,635,398 B2
(45) Date of Patent: Apr. 25, 2017

(54) REAL-TIME TRACKING COLLECTION FOR VIDEO EXPERIENCES

(71) Applicant: Adobe Systems Incorporated, San Jose, CA (US)

(72) Inventor: Andrei Cristian Ionescu, Bucharest (RO)

(73) Assignee: Adobe Systems Incorporated, San Jose, CA (US)

(*) Notice: Subject to any disclaimer, the term of this patent is extended or adjusted under 35 U.S.C. 154(b) by 30 days.

(21) Appl. No.: 14/070,014

(22) Filed: Nov. 1, 2013

(65) Prior Publication Data

US 2015/0128162 A1     May 7, 2015

(51) Int. Cl.
| | |
|---|---|
| H04H 60/32 | (2008.01) |
| H04N 21/24 | (2011.01) |
| H04N 21/2668 | (2011.01) |
| H04N 21/81 | (2011.01) |
| G06Q 30/00 | (2012.01) |
| H04N 21/2547 | (2011.01) |
| H04N 21/442 | (2011.01) |

(52) U.S. Cl.
CPC ......... H04N 21/2407 (2013.01); G06Q 30/00 (2013.01); H04N 21/2547 (2013.01); H04N 21/2668 (2013.01); H04N 21/44209 (2013.01); H04N 21/44222 (2013.01); H04N 21/812 (2013.01)

(58) Field of Classification Search
CPC ......... H04N 21/42201; H04N 21/4394; H04N 21/44008

USPC .......................................... 725/9, 14, 32, 36
See application file for complete search history.

(56) References Cited

U.S. PATENT DOCUMENTS

| | | | | |
|---|---|---|---|---|
| 2006/0277564 | A1* | 12/2006 | Jarman | ........................... 725/25 |
| 2010/0287580 | A1* | 11/2010 | Harding | ............ G06Q 30/0247 |
| | | | | 725/14 |
| 2013/0073388 | A1* | 3/2013 | Heath | .................... G06Q 50/01 |
| | | | | 705/14.53 |
| 2015/0026719 | A1* | 1/2015 | Menon | ........................... 725/34 |

* cited by examiner

*Primary Examiner* — Nnenna Ekpo
(74) *Attorney, Agent, or Firm* — Kilpatrick Townsend & Stockton LLP

(57) ABSTRACT

Methods and systems for tracking events associated with use of video content are disclosed. A method collects events associated with use of video content at a computing device. In response to determining that a tracking interval has elapsed, the method optimizes the collected events by grouping similar events together, serializes the optimized events by structuring the optimized events in a defined format, and creates a tracking call to send the serialized events to a remote computing device. A system determines setup parameters for tracking collection on a client computing device, the setup parameters comprising an error tracking parameter, and setup check and tracking intervals. The system periodically receives serialized event data from a client device in accordance with the tracking interval, the event data having been collected in response to occurrences of tracked events associated with use of video content at the client device, the video content including an advertisement.

20 Claims, 9 Drawing Sheets

REAL-TIME TRACKING COLLECTION FOR VIDEO EXPERIENCES

TECHNICAL FIELD

This disclosure relates generally to computer-implemented methods and systems for tracking use of video content and more particularly relates to tracking video playback experiences in real-time.

BACKGROUND

Video content can be distributed from a provider or publisher as video on demand (VOD), time-shifted television, live television, media such as a digital video disc (DVD), motion pictures distributed to theaters as digital video signals, and as electronic content distributed to computing devices. Video content can be broadcast over the air as digital signals, transmitted via satellite, and streamed, downloaded, and uploaded via communications networks such as the Internet.

Given the broad distribution of such video content and growing proliferation of viewing and playback devices for viewing such video content, publishers and distributors of video content often need to know how video environments, infrastructures, and video experiences are behaving in order to take needed actions in the shortest time interval. For example, publishers need real-time information in order to take actions to alter a quality of service (QoS) for video content as it is being viewed. Also, in the context of video advertising, publishers often need information regarding current use of video content to take actions related to a monetization approach or advertising strategy for the video content.

Current solutions for video tracking, such, the Quality of Experience (QoE) service from Conviva, a content delivery network (CDN) service from Akamai®, Inc., and analytics services from Google, Inc., either do not provide real-time video tracking or are limited as to the type of information and events that are tracked. These prior solutions do not address both quality of service and monetization. Traditional video-tracking techniques address quality of service and monetization using separate systems, interfaces, and software products. These prior solutions do not provide an all-inclusive solution for real-time tracking of playback of video content.

SUMMARY

In one embodiment, a method for tracking events associated with video content includes collecting event data for a plurality of events associated with use of a rendition of video content at a computing device. In response to determining that a defined tracking interval has elapsed, the method then optimizes the collected event data by grouping events having similar event data, serializes the optimized event data by structuring the optimized event data in a defined format, and creates a tracking call configured to send the serialized event data to another computing device remote from the computing device.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
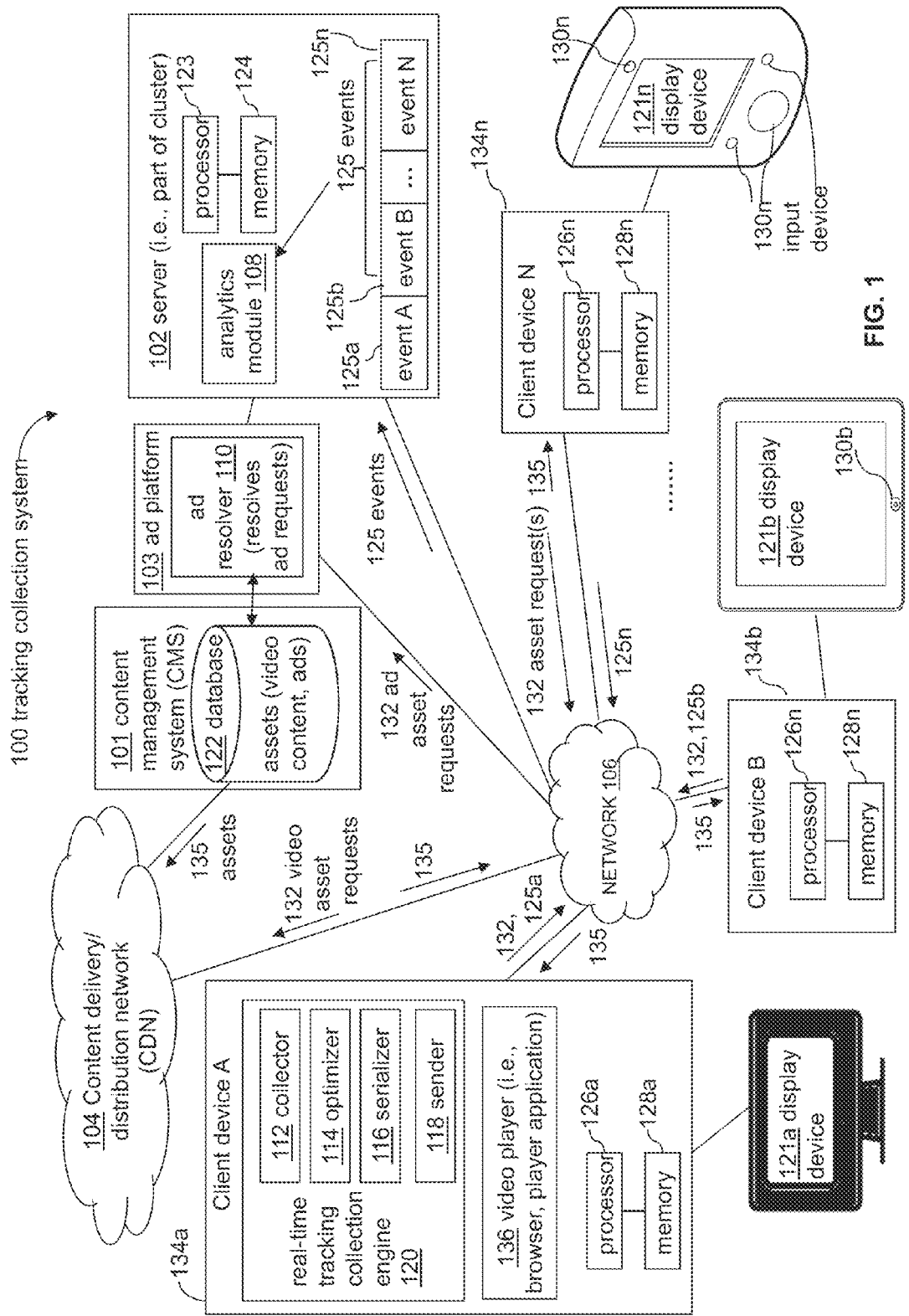
FIG. 1 is a block diagram depicting components of a video analytics tracking collection system, in accordance with embodiments.

Methods and systems are disclosed for efficiently tracking video playback experiences in real-time. The methods and systems provide real-time information regarding behaviours of video environments, infrastructures and video experiences. This information can be used, for example, by a publisher in order to take actions regarding quality of service (QoS) and monetization of video content within short time intervals as the video content is being used. Exemplary methods and systems disclosed herein allow publishers to quickly take appropriate actions regarding a desired QoS and a monetization approach for their video content based on real-time tracking of playback of the video content.

Embodiments disclosed herein provide automated and semi-automated methods and systems for real-time and near real-time collection of tracked events associated with playback of multimedia assets such as video content and advertisements (i.e., ads) included within video content. Embodiments track objects and events related to monetization, such as, but not limited to, presentations of and interactions with linear advertisements, overlay advertisements, and other types of advertisements in video content being viewed. Although exemplary computer-implemented methods and systems are described herein in the context of online video content, it is to be understood that the systems and methods can be applied to other multimedia assets, such as, but not limited to, video on demand (VOD) assets (i.e., pay-per-view movies and rental assets), subscription video on demand (SVOD) assets, live broadcasts, currently-airing or future-scheduled linear broadcasts of television programs, simultaneous broadcasts (simulcasts), movies shown in theaters, physical media such as digital video discs (DVDs), and software programs such as video games.

One embodiment provides a system that automates providing publishers with information such as the quality of service and monetization for video content in real-time. This information can be provided to multiple teams or entities to enable them to take informed actions related to a given video playback experience. For example, the system can provide a network operation team or network administrator with information regarding the current quality of service (QoS) for a network connection being used to access and view a video asset. Also, for example, the system can simultaneously provide a marketing team with optimal locations within video content to insert advertisements while the video content is in use. The system can simultaneously provide information to marketing staff regarding current revenue and budgets for video advertising campaigns in addition to other real-time monetization information.

Embodiments enable stakeholders such as publishers, network operation teams, marketing teams, business intelligence teams, and other entities to have current, accurate information regarding video playback experiences for video assets of interest.

Exemplary techniques efficiently track and collect information regarding playback of video assets (i.e., 'main video content playback'), playback of advertising (i.e., 'ads playback'), and quality of service. Events and information tracked for main video content can include a video start time or event (i.e., video start), completion of video playback (i.e., video complete), and a viewing time (i.e., time played). Video start information can include a timestamp corresponding to when playback of a video commenced. Video complete information can include a timestamp or other indication that a user has completed playback of a video. In embodiments, time played information can represent a duration that a user has been viewing a video asset, i.e., the elapsed time between a video start and a current time. In certain embodiments, the time played can account for pauses or interruptions to the video playback.

Ad playback information can include, for example, ad start information for an advertisement, an ad complete status or time, and revenue information associated with an advertisement. In an embodiment, ad start information for a linear or overlay advertisement can indicate a time mark or frame where an advertisement started within a video asset. In the case of interactive advertisements, ad start information can include a timestamp corresponding to when a user began playback of a particular advertisement. Other ad playback information can include events related to hypervideo or hyperlinked video advertisements. Hypervideo advertisements can be embodied as displayed video streams containing embedded, selectable or actionable (i.e., user-clickable) anchors. Ad playback information for such hypervideo advertisements can include events corresponding to a selection or click of an anchor. Ad complete information can indicate a frame, time marker, or timestamp corresponding to when an advertisement placed within a video asset was completed. Revenue information can include financial data related to an advertisement, such as costs per placement (i.e., cost for each insertion into a video asset), costs per impression (i.e., cost per presentation or viewing), remaining budget for an advertisement or campaign, and sales corresponding to an advertisement (i.e., sales resulting from conversions, click-throughs or other user interactions with an advertisement impression).

Quality of service (QoS) information can indicate real-time metrics for buffering, bitrate switching, and errors related to viewing, streaming, downloading, or other access of a video asset via a network.

As a result of collecting the above described information regarding video playback, ad playback, and QoS metrics, exemplary methods and systems provide metrics such as, but not limited to, concurrent streams, peak concurrent streams, ad impressions, ad drop off, revenue, buffering impacted streams, average bitrate, and error rate for a video asset. In embodiments, the real-time video tracking disclosed herein can be implemented inside a software as a service (SaaS) application, such as, for example, as Adobe® SiteCatalyst. This embodiment provides real-time client-side web analytics data together with the tracked and collected video playback, QoS, and monetization events.

Embodiments collect, optimize, serialize and send events related to video streaming and analytics from complex video and analytics systems. Such systems can comprise the following main components: a client component where a video player resides and a server side where multiple other components make video analytics and reporting possible. The client component can be configured to perform data collection and generate the tracking calls needed for the data collection. Certain embodiments use a client component, which can be a client-side application that implements a video player. The video player can be accessed via a network such as the Internet (i.e., a web application) or a native client application executing locally on a client device. In embodiments, the video player includes or is formed from components including a video playback engine and an ad insertion mechanism (see, for example, core player 238 and ad insertion mechanism 240 in FIG. 2). In the non-limiting embodiments shown in FIG. 2, a video player 136 includes a core player 238 implemented and built using the Adobe® Primetime software development kit (SDK), and the ad insertion mechanism 240 uses Adobe® Auditude advertisement insertion classes. For example, the tracking collection techniques described herein can be made available as a service for real-time video tracking by the Adobe® Primetime SDK. Also, for example, the ad insertion mechanisms described herein can use the Adobe® Auditude video advertising platform.

Exemplary embodiments provide video-specific, actionable, predictive intelligence about viewer engagement (i.e., audience engagement) for video content and monetization regarding ads included in the video content. By performing tracking collection on a substantially real-time basis, embodiments enable users to quickly identify effectiveness and profitability of video advertising strategies. For example, by providing audience segment traffic on a near real-time basis, the systems and methods described herein enable users to quickly identify high-value viewers, and determine when viewers such as web site visitors are navigating away from video content as the navigation occurs. Exemplary embodiments produce real-time reports and render user interfaces that enable users to efficiently identify success metrics for online video publishing and advertising. The user interfaces can include real-time dashboards graphically depicting audience engagement information across multiple video assets and ads. The interfaces provide real-time insight into which viewers are watching video content and what actions and events are occurring for live video content as it is being viewed. Exemplary systems render real-time dashboards displaying integrated QoS metrics that provide information on upstream origination services from video encoders, packagers, and originators, as well as information regarding stream quality, bandwidth, and drop-offs. Such QoS metrics enable network administrators and operators to proactively address potential performance issues in near real-time in order to reduce the likelihood of more severe performance problems. Embodiments provide substantially simultaneous access to real-time events and metrics to both network operators and analytics systems. These embodiments can provide the event data and metrics to analytics systems such as, for example, Adobe® Analytics. Certain embodiments allow historical analysis to be performed in an integrated data platform including real-time and historical event data and metrics that are made available and tailored to network operations staff as well as marketing/advertising analyst teams.

In certain embodiments, advertisements can be selected from a plurality of advertisements provided by one or more advertisement networks. In one embodiment, an advertisement network can comprise three general categories of entities: 1) content providers, distributors, and other entities who create and offer video content (collectively "publishers"); 2) advertisement providers, advertisers, promoters, advertising distributors, and other entities who are the source of advertisements (collectively, "advertisers"); and 3) viewers, subscribers, consumers, theaters, and other entities who request, receive, and/or watch video content offered by publishers (collectively, "viewers").

One embodiment provides an administrator user interface (UI) that publishers and advertisers can use to upload video content, advertisements, and associated metadata into the system. In an embodiment, the administrator UI can be used to set and update setup parameters for real-time video tracking. In certain embodiments, references to the video content are provided via the administrator UI instead of full copies of the content. As used herein, the term "metadata" is used to refer to information associated with (and generally but not necessarily stored with) electronic content items such as video content and advertisements that provides information about a property of the electronic content item. Metadata may include information uniquely identifying an electronic content item. Such metadata may describe a storage location or other unique identification of the electronic content item. For example, metadata describing a storage location of video content may include a reference to a storage location of a copy of the video content in a server system used by publishers, advertisers, and users. One example of such a reference is a Uniform Resource Locator (URL) identifying the storage location on a web server associated with a publisher's web site. Such references can be provided by publishers as an alternative to uploading a copy of the video content to the system via the administrator UI.

An embodiment of the system includes a repository, such as a data store or database, for storing the uploaded advertisements, the video content (or references thereto), and their metadata. An example database 122 is described below with reference to FIG. 1. The metadata can include characteristics and properties of assets such as video content and advertisements. The video content properties can include, but are not limited to, genre/category, rating, duration, color palette/scheme, resolution, format, language options, captioning options, publisher, cast, director, date/timestamp information, playback restrictions, markers for temporal locations of advertising breaks, compatible/supported rendering/viewing platforms, and other properties of video content. Some video content properties, such as a genre or publisher, can apply to an entire video asset, while other properties are relevant to certain portions or frames of the video asset. For example, metadata useful for inserting advertisements in video content such as cut points, scene changes, opening credits, closing/end credits, and similar information, does not apply to every frame in a given video asset. Similarly, format properties can indicate whether all or a portion of a video asset is two-dimensional (2D) or three-dimensional (3D). Playback restriction properties can include regional or age-based restrictions as well as restrictions on a number of viewings or a time limit for viewing (i.e., for VOD and rented video content). For a rented video asset, a playback restriction property can indicate the length of a video asset rental as a duration (i.e., 24 hours). The compatible/supported rendering/viewing platform properties can indicate minimum requirements for viewing the video content, such as supported resolutions, compatible video players, and supported client device platforms. For example, these properties can indicate a minimum display resolution, display size, operating system (OS) version, and/or player/browser version needed to play the video content.

Some or all of the video content and ad properties can be in the form of metadata included as tags/keywords, data carrying icons, or markers stored within video content and advertisements. For example, the metadata can be included outside of visible areas of frames of the video content and advertisements. Non-limiting examples of metadata for electronic content items can include a title, author, keywords, and the like. Metadata may also describe a relationship between video content and advertisements, such as how the video content and the advertisements can be combined to create renditions of video content including the advertisements. Metadata can also describe when and how an electronic content item was created, such as information identifying application used to create the item, a timestamp, a file type, encryption status, and other technical information for the item, and/or access rights for the item. In certain embodiments, the metadata can include rendering attributes and their values for video content or an advertisement. For example, if a rendering attribute is included in metadata for video content, the metadata can also include a value for that rendering attribute specific to rendering the content via a video player application that the content is to be viewed with. Depending on the encryption status and/or access rights, video content may be transmitted to/from the publisher via secure network connections or data links. Non-limiting examples of such secure connections include connections made using the Secure Sockets Layer (SSL) protocol or the Transport Layer Security (TLS) protocol. As would be understood by those skilled in the relevant art(s), SSL and TLS connections are made via cryptographic protocols to provide communication security over data networks such as the Internet. In additional or alternative embodiments, properties can be stored separately from the video content in a repository such as database 122, which is described below with reference to FIG. 1.

The ad properties can include, but are not limited to, product/service category, duration, target demographic, target region, color palette/scheme, translucency, shape, format, size, dimensions, resolution, language options, date/timestamp information, monetary cost per placement, monetary cost per mille/thousand impressions (CPM), number of prior insertions/placements, budget, expiration, and other metadata about the advertisement. The format properties can indicate whether the video content and the advertisement is 2D or 3D. In cases where the format of advertisement is 3D, the dimension property includes a depth of the advertisement. The size and dimension properties can be in terms of pixels. In embodiments, a number of placements can be expressed as a number of times the advertisement has been inserted in video content and this property, in combination with the monetary cost per placement and/or budget properties, can be used to determine if there is any remaining budget for inserting the advertisement into video content. The expiration property can be embodied as an expiration date in order to determine if an advertisement is still available for insertion into video content. For example, if an advertisement includes time-sensitive information, such as information pertaining to a scheduled event, such as, but not limited to, a sale occurring within a date/time range, a time-sensitive promotion, a product release date, a television program debut, a theatrical movie release, or a temporary offer, the expiration property can be set accordingly so that the advertisement is not inserted into video content after a certain date or time.

According to an embodiment, when a user requests video content offered by a publisher who is a member of the advertisement network, a rendition of the requested content with advertisements from an advertiser in the network is delivered to the user. The user can request the video content via a smart TV, a set top box (STB), or a video player application, such as the exemplary video player 136 described below with reference to FIG. 1. In one embodiment, the user can request and view video content in the video player 136 executing on a client device having a display. The video player 136 can have a video player UI that users can interact with to select, preview, and view video content. The selected video content can be downloaded or streamed to a client device where video player 136 is executing. For example, in the context of online video content, when a user requests video during a visit to a publisher's web site, that user will receive some advertisements.

The ad provider (i.e., an advertiser, organization, government agency, television network, VOD supplier, or other entity wishing to convey information via an advertisement) can publicize and promote items indicated in advertisements. For example, in embodiments where the ad provider is an advertiser, the advertiser can increase awareness of a service, product or brand offered for sale. As would be understood by those skilled in the relevant art(s), this increased awareness can correspond to increased sales of the service, product, or branded items indicated in the advertisement. In embodiments, ad providers can be video content providers, such as, but not limited to, television networks, web sites, VOD suppliers, and movie/film studios, who wish to place advertisements promoting their television programs, online video content, and films.

Figure 2:
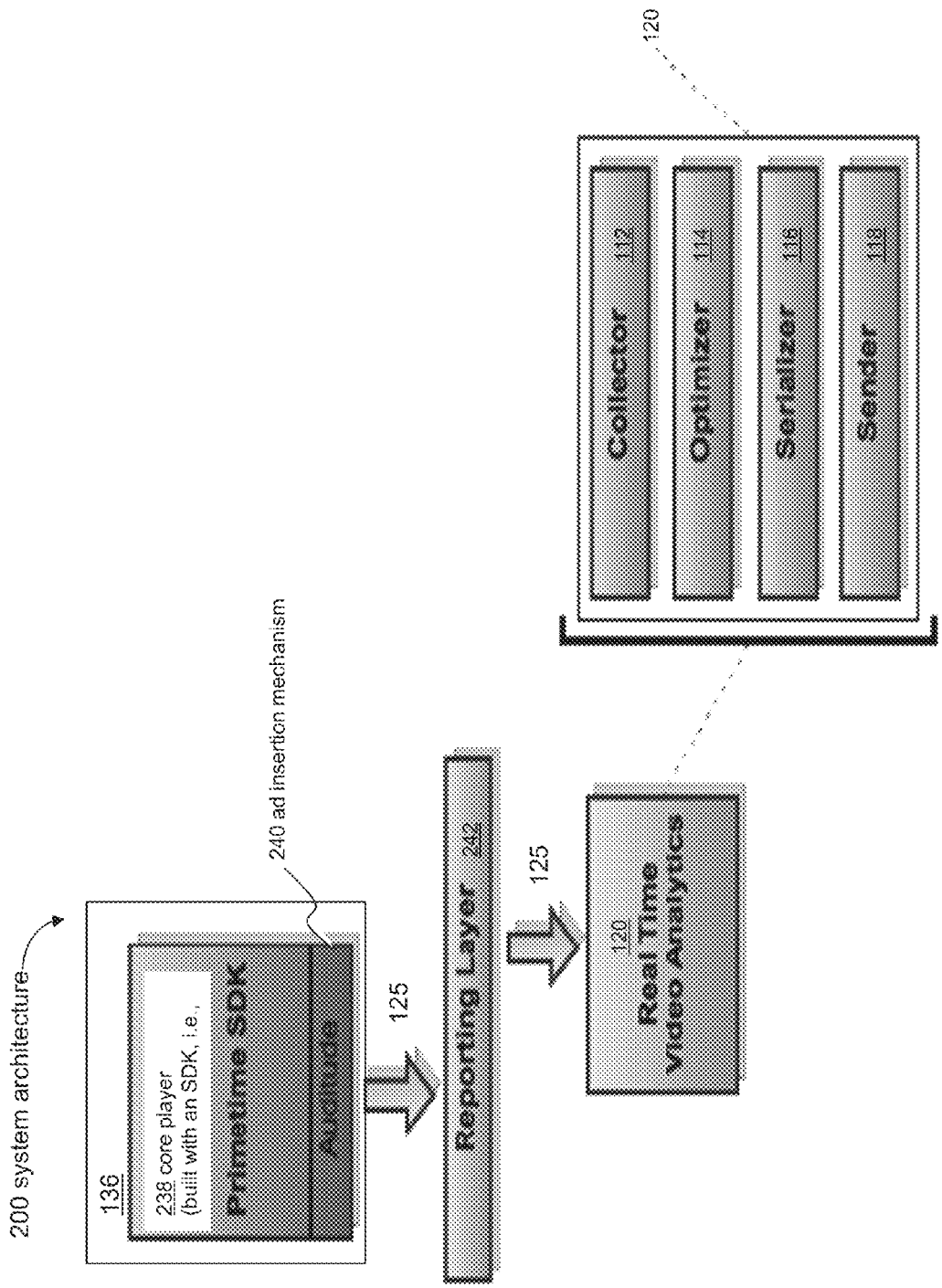
FIG. 2 is a block diagram depicting a system architecture for a video analytics tracking collection system, in accordance with embodiments.

The video content provider (i.e., a distributor, publisher, or web-site) can receive revenue from the ad provider for displaying the ad provider's advertisement in video content offered by the video content provider. In turn, this revenue stream can allow video content providers to offer consumers, such as subscribers, and viewers of the video content additional services. These additional services can include more video content, reduced-price (or free content), and/or content with increased quality. Where the video content is provided online as electronic content, increased quality can be embodied as a higher resolution rendition of the video content and/or a rendition of the video content without some linear advertisements. In embodiments, the revenue stream from advertisements enables video content providers to reduce prices for video content. For example, reduced-price or free renditions of iTunes® videos, iTunes® apps and games containing video content, pay-per-view video assets such as movies and television programs, Amazon® Video On Demand assets, and VOD video content can be offered to consumers. Embodiments address issues related to tracking and collecting events related to playback of video content and advertisements inserted into the video as a result of resolving an advertisement request. In the examples of FIGS. 1 and 2, an ad resolver 110 can be invoked to find the most suitable advertisement(s) for video content requested by a client device 134 and then an ad insertion mechanism 240 can retrieve and insert the advertisement(s) into the video content as it is being played in a video player 136. Embodiments address important aspects in online advertising, e.g., collecting event data that can be used to decide what sum an ad provider or advertiser will pay for a selection (i.e., a click) on an interactive advertisement. This can be addressed through a bidding process (e.g., bidding on objects to be placed in video content) and/or by using ad properties pertaining to budget such as monetary cost per placement and/or cost per mille/cost per thousand advertising impressions (CPM) for an advertisement.

As used herein, the term "video content" refers to any type of audiovisual media that can be displayed or played on computing devices via video player applications, television devices, projection television systems, digital video recorder (DVR) devices, DVD devices, game consoles, computer-implemented video playback devices, mobile multimedia devices, mobile gaming devices, and STB devices. An STB can be deployed at a user's household to provide the user with the ability to control delivery of video content distributed from a provider. Video content can be electronic content distributed to computing devices via communications networks such as, but not limited to, the Internet.

Video content including advertisements selected by the exemplary ad resolver and inserted by the exemplary ad insertion mechanism (see, e.g., ad resolver 110 and ad insertion mechanism 240 in FIG. 2) disclosed herein can be previewed, selected and viewed by various video player applications, devices and platforms used to select and view video content. Such devices can be components of platforms including personal computers, smart phones, personal digital assistants (PDAs), tablet computers, laptops, digital video recorders (DVRs), remote-storage DVRs, interactive TV systems, and other systems capable of receiving and displaying video content and/or utilizing a network connection such as the Internet. An exemplary interactive TV system can include a television or other display device communicatively coupled to an STB. With reference to FIG. 1, exemplary client device 134a can include, without limitation, a display device 121a and an Internet Protocol (IP)-based (i.e., IPTV) STB. As shown in FIG. 1, another exemplary client device 134b can be embodied as a tablet computing device, and yet another exemplary client device 134n can be embodied as a smartphone. References to a client device or video player should therefore be interpreted to include these devices and other similar systems involving display of video content and viewer input.

Video content can be in the form of electronic content streamed from a server system to a web-enabled television (i.e., a smart television), a projection television system, or a client computing device. Streaming electronic content can include, for example, live and on-demand audiovisual content provided using a streaming protocol, such as, but not limited to, Internet Protocol television (IPTV), real-time messaging protocol (RTMP), hypertext transfer protocol (HTTP) dynamic streaming (HDS), HTTP Live Streaming (HLS), and Dynamic Adaptive Streaming over HTTP (MPEG-DASH). A server system can provide multiple renditions of video content having different quality levels and language options, such as captioning or audio dubbing.

Computer-implemented systems and methods are disclosed for real-time collection and tracking of events related to playback of video content and advertisements included within the video content. In embodiments, advertisements can include text, multimedia, or hypervideo content. An interactive user interface (UI) for an application executed at a computing device can be used to view reports summarizing collected tracked events and properties associated with video content. As used herein, the terms "real-time," "real time," "near real-time" and "substantially real-time" are used to refer to processing performed within strict time constraints. For example, in embodiments, real-time tracking and collection of events can be performed as the events occur without a perceivable delay after the occurrence of the events.

As used herein, the term "electronic content" is used to refer to any type of media that can be rendered for display, played on, or used at a computing device, television, or other electronic device. Computing devices include client and server devices such as, but not limited to, servers, desktop computers, laptop computers, smart phones, video game consoles, smart televisions, tablet computers, portable gaming devices, personal digital assistants, etc. Electronic content can include text or multimedia files, such as images, video, audio, or any combination thereof. Electronic content can be streamed to, downloaded by, and/or uploaded from computing devices. Electronic content can include multimedia hosted on websites, such as web television, Internet television, standard web pages, or mobile web pages specifically formatted for display on computing devices. Electronic content can also include application software developed for computing devices that is designed to perform one or more specific tasks at the computing device. Electronic content can be delivered as streaming video and as downloaded data in a variety of formats, such as, for example, a Moving Picture Experts Group (MPEG) format, an Audio Video Interleave (AVI) format, a QuickTime File Format (QTFF), a DVD format, an Advanced Authoring Format (AAF), a Material eXchange Format (MXF), and a Digital Picture Exchange (DPX) format. Electronic content can also include application software that is designed to perform one or more specific tasks at a computing system or computing device.

As used herein, the term "rendition" is used to refer to a copy of video content provided to a video player or client device. Different renditions of electronic content can be encoded at different bit rates and/or bit sizes for use by client devices accessing electronic content over network connections with different bandwidths. Different renditions of the video content can include different advertisements for viewing on client devices located in different regions. Renditions of video content can vary according to known properties of a video player application, a client device hosting the video player application, and/or stream/network connectivity information associated with the client device. For example, a video asset can include multiple renditions of the video as separate video clips, where each rendition has a different quality level associated with different bit rates.

As used herein, the term "asset" is used to refer to an item of electronic content included in a multimedia object, such as text, images, videos, or audio files. As used herein, the term "image asset" is used to refer to a digital image included in a multimedia object. One example of an image asset is an overlay advertisement. As used herein, the term "video asset" is used to refer to a video file included in a multimedia object. Video content can comprise one or more video assets. Examples of video assets include video content items such as online videos, television programs, television broadcasts/simulcasts, movies, VOD videos, and SVOD videos and video games. Additional examples of video assets include video advertisements such as linear and hypervideo advertisements that can be inserted into video content items. As used herein, the term "text asset" is used to refer to text included in a multimedia object. Exemplary advertisements can be embodied as a text asset, an image asset, a video asset, or a combination of text, image, and/or video assets. For example, advertisements can include a text asset such as a name of a company, product, or service, combined with an image asset with a related icon or logo. Also, for example, advertisements can include video assets with animation or a video clip.

For simplicity, the terms "multimedia asset," "video asset," "online video content," and "video content" are used herein to refer to the respective video assets or video contents regardless of their source (i.e., publisher, advertiser, or distributor), distribution means (i.e., web site download, broadcast, live streaming, content delivery network/CDN, simulcast, or theatrical release), format (i.e., MPEG, high definition, 2D, or 3D), or playback means (i.e., video player 136 executing on a client device 134, browser executing on a computing device, television, projection system, or DVD player) used to view such files and media. For example, where the publisher of a video asset is a television network, movie/film studio, or production company, the video asset can be a television program or motion picture. Renditions of this video asset can be embodied as streaming or downloadable online video content available from a web site of the publishers or a distributor's web site. Another rendition of the video asset can also be made available as video content on media such as a DVD, a DVR recording, or VOD obtained via an STB and viewed on a television.

As used herein, the term "network connection" refers to a communication channel of a data network. A communication channel can allow at least two computing systems to communicate data to one another. A communication channel can include an operating system of a first computing system using a first port or other software construct as a first endpoint and an operating system of a second computing system using a second port or other software construct as a second endpoint. Applications hosted on a computing system can access data addressed to the port. For example, the operating system of a first computing system can address packetized data to a specific port on a second computing system by including a port number identifying the destination port in the header of each data packet transmitted to the second computing system. When the second computing system receives the addressed data packets, the operating system of the second computing system can route the data packets to the port that is the endpoint for the socket connection. An application can access data packets addressed to the port.

Exemplary System Implementation

Referring now to the drawings, FIG. 1 is a block diagram illustrating components of an example tracking collection system 100 implementing certain embodiments. The example system 100 includes a server 102 configured to perform server-side processing in response to inputs and data received from client devices 134 via a network 106. In accordance with embodiments, server 102 is not a single physical server machine or platform, but is instead implemented using separate servers tied together through network, such as network 106. For example, server 102 can be implemented as a cluster of servers, systems, and platforms. In the non-limiting example depicted in FIG. 1, server 102 can be part of a cluster including ad platform 103 and content management system (CMS) 101. As shown, ad platform 103 includes an ad resolver 110 in charge with resolving advertisement (ad) requests, and CMS 101 manages a database 122 storing video content assets and ads, and server/cluster 102 hosts an analytics module 108 and is configured to receive events 125 via tracking calls from client devices 134. In one embodiment, server 102 functions as a tracking server that receives and stores data related to tracked objects and events. In alternative embodiments, analytics module 108 can be part of a separate analytics server, system, or platform (not shown), such as, for example, Adobe® Analytics. Such an analytics platform can provide publishers, distributors and advertisers with means for measuring, analyzing, and optimizing distribution of video and advertisement assets 135 based on data integrated from online video across multiple distribution channels. In alternative embodiments shown in FIG. 5, the server-side ad resolver 110 can work in conjunction with a client-side ad resolver 110 component and an ad insertion mechanism 240 to resolve ad requests and insert ads. In additional or alternative embodiments, besides being hosted on advertising platform 103, server-side ad resolver 110 can be hosted on a separate advertising system or platform (not shown) that serves ad assets 135 to be inserted into video assets 135.

Tracking collection system 100 and server 102 provide a platform for tracking collection for respective video experiences on a plurality of client devices 134 so that events 125 are serialized and sent from client devices 134 to server 102 in near real-time. Client devices 134 are configured to perform client-side tracking and collection of events 125 and properties. Embodiments of the engines, modules and components shown in FIG. 1 can be configured to collect and report tracked events for any type of asset 135, including video assets such as, for example, online video, live video, VOD assets, SVOD assets, currently-airing or future-scheduled linear broadcast television programs, simultaneous broadcasts (simulcasts), streaming video, and advertisements inserted into such video assets. The advertisements can include any electronic content that can be inserted into video assets, such as, but not limited to, linear advertisements, overlay advertisements, and hypervideo advertisements.

As shown in FIG. 1, client devices 134 can each include a processor 126 communicatively coupled to a memory 128. As shown, tracking collection system 100 includes server 102, client devices 134a-n, a content delivery network 104, and a network 106. Client devices 134a-n are coupled to server 102 via network 106. Processors 126a-n are each configured to execute computer-executable program instructions and/or accesses information stored in respective ones of memories 128a-n. Server 102 includes a processor 123 communicatively coupled to a memory 124. Processor 123 is configured to execute computer-executable program instructions and/or accesses information stored in memory 124. Processors 123 and 126a-n shown in FIG. 1 may comprise a microprocessor, an application-specific integrated circuit (ASIC), a state machine, or other processor. For example, processor 123 can include any number of computer processing devices, including one. Processor 123 can include or may be in communication with a computer-readable medium. The computer-readable medium stores instructions that, if executed by the processor, cause one or more of processors 123 and 126a-n to perform the operations, functions, and steps described herein. When executed by processor 123 of server 102 or processors 126a-n of client devices 134a-n, the instructions can also cause one or more of processors 123 and 126a-n to implement the modules, applications, and engines shown in FIGS. 1 and 2. When executed by one or more of processors 126a-n of client devices 134a-n, the instructions can also cause processor to render the user interface and reports shown in FIG. 7 on respective ones of display devices 121a-n.

Client devices 134a-n may also comprise a number of external or internal devices, including input devices 130 such as a mouse, keyboard, buttons, stylus, touch sensitive interface. Client devices 134a-n can also comprise an optical drive such as a CD-ROM or DVD drive, a display device, audio speakers, one or more microphones, or any other input or output devices. For example, FIG. 1 depicts the client device 134a having a processor 126a, a memory 128a, and a display device 121a. A display device 121 can include (but is not limited to) a screen integrated with a client device 134, such as a liquid crystal display ("LCD") screen, a touch screen, or an external display device 121, such as a monitor.

For simplicity, an exemplary video player 136 and components of a real-time tracking collection engine 120 are shown in FIG. 1 as being hosted on client device 134a. It is to be understood that in embodiments, each of the client devices 134a-n include respective video players 136 and real-time tracking collection engines 120. Similarly, each of the real-time tracking collection engines 120 can include the collector 112, optimizer 114, serializer 116 and sender 118 components shown in FIG. 1 as being included in the real-time tracking collection engine 120 installed on client device 134a.

As shown, client devices 134a-n each include respective display devices 121a-n. Client devices 134 can render assets 135, such as video content and advertisements in the video player 136 shown in FIG. 1. Client devices 134 can also render the video overview user interface (UI) 700 shown in FIG. 7. Client devices 134a-n can include one or more software modules or applications to configure their respective processors 126a-n to collect, optimize, serialize and send respective events 125a-n associated with video content assets 135 provided by CMS 101 via CDN 104 and network 106. Such modules and applications can configure the processor 126 to send an event 125 associated with playback of video content being displayed on display device 121. For example, client device 134a hosts a real-time tracking collection engine 120 including modules for collecting and sending events 125 to server 102. As shown, the exemplary real-time tracking collection engine 120 includes a collector 112, an optimizer 114, a serializer 116, and a sender 118.

Although FIG. 1 depicts collector 112, optimizer 114, serializer 116, and sender 118 as separate modules, one or more of these modules can be included as a software module of a single application. Similarly, while database 122 is shown in FIG. 1 as being hosted locally on CMS 101, in alternative embodiments, database 122 can be hosted on an external server (not shown) remote from CMS 101. For example, database 122 can be hosted on a dedicated database server accessible from CMS 101 via CDN 104 or network 106. Tracking collection system 100 stores assets such as video content and advertisements, as well as additional information such as video and advertisement metadata, in database 122. Some of the additional information may be explicitly specified or input when publishers and ad providers (i.e., advertisers) upload video content and advertisements to ad platform 103. For example, titles, descriptions, and tags/keywords can be entered by publishers and advertisers at upload time. Descriptions of exemplary functionality of analytics module 108 and ad resolver 110 are provided in the following paragraphs.

According to an embodiment, analytics module 108 is configured to perform a set of event tracking and processing operations for a given set of events 125 associated with playback of video content assets 135, in substantially real-time as the events 125 are received at server 102 from client devices 134a-n. In one embodiment, certain event processing operations are performed at defined intervals as events 125 are sent from client devices 134a-n in specified intervals, in order to optimize use of processing and memory capacity from processor 123 and memory 124. According to embodiments, a chained list of events 125 for the client devices 134 can be stored in memory 124 or in database 122.

Figure 7:
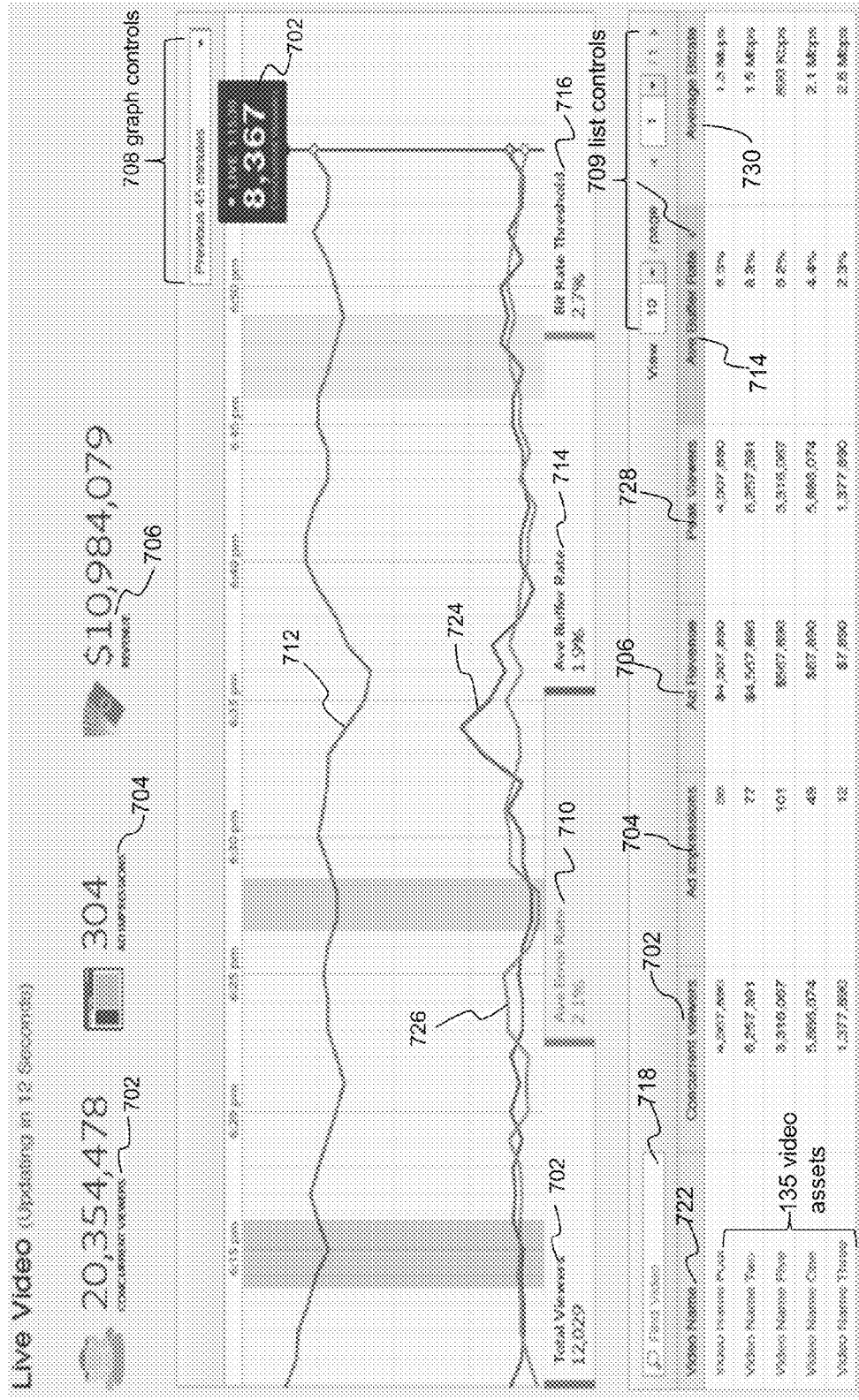
FIG. 7 illustrates an example user interface for displaying reports indicating tracked events and analytics data for video assets, in accordance with embodiments.

In accordance with an embodiment, analytics module 108 aggregates events 125 and metrics to create analytics reports and user interfaces (UIs), such as the exemplary reports and UI shown in FIG. 7. Analytics data aggregated and tabulated by analytics module 108 can be used by ad resolver 110 in order to find advertisements that are most related to requested video content (i.e., advertisements that best fit the video content).

In one exemplary implementation, ad resolver 110 evaluates criterion to determine the degree to which the selected video content and an ad fit together. On example criteria is semantic similarity between the selected video content and advertisements. Semantic similarity can be based at least in part on keywords and other metadata associated with video content and advertisements and stored in database 122. Advertisers may insert keywords along with their advertisements in order to express their preference toward having their advertisements placed in video content related to certain subject matter. Semantic similarity can be evaluated in order to try to match advertisements and video content based on their respective tags/keywords and other content properties because semantically related advertisements are more likely to be of interest to a certain viewer.

In an embodiment, ad resolver 110 is invoked to resolve an ad request triggered when a user selects a particular video asset or video content for viewing. The selection can be made, for example, in the user interface of video player 136 executing at client device 134a, via interaction with a remote control or other input device at an STB. Video content can also be selected and requested for viewing at a tablet client device 134b via interaction with video player 136 controls rendered on touch screen display device 121b and/or via a button input device 130b. Similarly, video content can be requested at a smartphone client device 134b via interaction with video player 136 controls rendered on touch screen display device 121n and/or by using button input device 130n, or other user input received at a client device 134 via other input devices 130, such as, for example a keyboard, mouse, stylus, track pad, joystick, or remote control. The selection is then sent as a request from the client device 134 to CDN 104 via network 106. In embodiments, when a request 132 for a selected video asset is received at CDN 104, or a request 132 for an ad asset is received at ad platform 103, ad resolver 110 queries database 122 to find advertisements to be inserted into the requested video content. In this embodiment, the query results in indications of the advertisements and their properties being returned to ad resolver 110, where the query includes indications of at least some properties of at least one of the selected video content, the requesting client device 134, the video player 136, and a user associated with the client device 134. Based at least in part on properties of advertisements returned by database 122 and properties of the requested video content, ad resolver 110 can also determine some appropriate spatial locations (i.e., coordinates within zones or regions of the viewable video content) and temporal positions (i.e., starting/ending points in frames of the video content) to insert the advertisements. One example of temporal positions for ads is a defined advertisement break.

Ad resolver 110 is configured to resolve ad requests corresponding to asset requests 132 received at CDN 104 and/or CMS 101. The ad resolution performed by ad resolver 110 can be conceptualized as an ad matching process that is based in part on properties of requested video assets 135 and ad assets 135 stored in database 122. For example, ad matching can be based in part on video segmentation, wherein the structure of the video content and other useful information is extracted from video content at upload-time. In one embodiment, such information can be stored in database 122. In response to receiving an ad request 132 from a client device 134, ad platform 103 and its ad resolver 110 can determine advertisements and a quality level for a rendition of a video asset 135 to be made available to video player 136. Ad resolver 110 can apply one or more of video-ad matching criterion to identify ad assets 135 deemed relevant to the requested video content. In certain embodiments, properties of the requesting client device 134 can also be used by ad resolver 110 to select ads. For example, if a particular client device 134 is a mobile device, ads related to mobile device's products and services can be inserted into the event 125 provided to the client device 134. Also, for example, in response to determining that a requesting client device 134 is located in a given geographic region, or physical location (i.e., based on a Global Positioning System (GPS) location of the client device 134, a media access control (MAC) address of the client device 134, a network address of the client device 134, or other identifying information, CDN 104, in conjunction with ad platform 103 and CMS 101, can provide the requested video content with advertisements deemed pertinent to the determined location or time zone. Server 102 can also determine an ideal quality level for a rendition of a video asset 135 based at least in part on determining current communication capabilities, network connectivity/QoS (i.e., buffer rate, bitrate, download speed), and/or a hardware profile of the requesting client device 134.

The ad resolver 110 can resolve ad requests and match ads to video assets 135 based on properties of the ad and of the video content the ad is to be placed in. The ad resolver 110 can retrieve and update advertisement data stored in database 122. According to embodiments, the advertisement data can indicate properties such as one or more of a number of placements for each advertisement, an ad category, a cost per mille/cost per thousand advertising impressions (CPM), a duration, a remaining budget, and a remaining number of placements for ads.

With continued reference to FIG. 1, an advertiser can interact with a user interface (not shown) rendered on a display device 121 to upload an ad to ad platform 103 for storage in database 122. In additional or alternative embodiments, ads are uploaded to a separate ad server (see, ad server 422 in FIG. 4). In an embodiment, an advertiser user interface (UI) allows an advertiser to upload a new advertisement, along with ad properties, such as keywords representing the desired context or video content in which the ad should appear. Advertisements uploaded via advertiser UI can be interactive in that they can include a selectable hyperlink with a target URL that a viewer can click on while playing video content including the advertisement. For such interactive advertisements, the ad properties entered via advertiser UI can include the target URL associated with a supplier of a product, brand, or service indicated in the interactive advertisement. For example, a viewer, using an input device, can interact with a video player 136 to click on an interactive advertisement in order to navigate to the target URL in a new browser tab, window or session. After an advertisement has been uploaded, metadata with properties (i.e., features) of the uploaded advertisement can be extracted by ad platform 103, which then stores the extracted ad properties in database 122.

Server 102 can read metadata for the received video content that applies to the entire video in order to categorize the content. For example, genre, resolution, format, access-control, rating and duration properties of the received video content can be indexed and stored in a database 122 with a reference to the video content so that the videos having a certain category can be quickly retrieved from database 122 as needed. In embodiments, when ad resolver 110 needs to match an ad that is appropriate to a certain type of video segment, the video properties data stored in database 122 CMS 101 can be used to quickly locate clips within video content matching the desired criteria. For example, ad resolver 110 can match ads appropriate for a sports video clip having a certain duration that is rated for viewing on a video player 136 in a certain region by a user in a given age group to video content meeting these criterion using ad and video properties data stored in database 122. Sever 102 can also read and store more granular metadata for uploaded video content that does not apply to every segment, portion or frame of the video content. Such granular metadata can, for example, can pertain to properties useful for tracking collection such as indications of ad breaks and frames including cut points or scene changes.

Users of the tracking collection system 100 can include video content publishers, ad providers (i.e., advertisers), and viewers (i.e., end users of video content). Once a publisher uploads video content to CMS 101, the video content is added to database 122 as a new video asset 135 along with metadata, such as, but not limited to, a brief description, title, and tags/keywords for the uploaded video content. The keywords can be used by ad resolver 110 for selecting appropriate ads to be subsequently inserted into video content. Ads can be inserted into a video asset 135 by the video player 136 on a client device 134 (see, e.g., ad insertion mechanism 240 shown in FIG. 2).

In one embodiment, a cluster including CMS 101 and ad platform 103 provides a platform where publishers upload video content such as their video assets and advertisers upload advertisements such as their linear and overlay advertisements. Tracking collection system 100 can be configured to provide, via CDN 104, video assets 135 and advertisement assets 135 to be inserted into the video content to end-users or 'consumers' who view video content in a video player 136. In this embodiment, ad resolver 110 automatically handles ad selection for a requested video asset 135. Such ad selection can be performed in response to an ad request received, for example as an asset request 132, at ad platform 103. The ad request can be implicit in that it is not explicitly requested by a viewer or user of a video player 136, but is instead implicitly sent based on properties of video content requested by the user. Implicit ad requests can also be based at least in part on one or more of properties of a video player 136, properties of a client device 134, and properties of a user associated with the client device 134. In an alternative embodiment, ad resolution may be done externally on a remote system or server through a bidding process where an advertiser specifies how much he would pay to have his ad shown in certain video content. According to this alternative embodiment, the ad matching can be based at least in part on a profile of a user who selects particular video content for viewing within video player 136.

A user can preview, select, and watch videos, along with inserted advertisements using the video player 136. In one embodiment, video player 136 is embodied as browser with a UI configured to render, on display device 121, a video content web site that allows visitors to the web site to navigate, browse, and search a list of videos. Delivery of the selected video content and the advertisements determined by ad resolver 110 can be accomplished via streaming, downloading, or pushing (i.e., podcasting) the content to video player 136 and use of an ad insertion plug-in. When a user requests video content to be viewed on video player 136, the video and ad properties data stored in database 122 can be used by ad resolver 110 to match the requested video with corresponding advertisements, and to identify a good location to place the matched advertisements, such as, for example, defined ad breaks in a video asset 135. In one embodiment, a user executing video player 136 on client device 134 interacts via input devices 130 to control playback of a currently selected video and inserted ads.

In an embodiment, client devices 134 comprise one or more video navigation devices, such as, but not limited to, an input device 130 configured to interact with browser-based UI of a video player 136, a touch screen display device 121, and an STB. Exemplary STB client device 134b can include, without limitation, an Internet Protocol (IP)-based (i.e., IPTV) STB. Embodiments are not limited to this exemplary STB client device 134b interfacing with network 106, and it would be apparent to those skilled in the art that other STBs and video navigation devices can be used in embodiments described herein as a client device 134, including, but not limited to, personal computers, mobile devices such as smart phones, laptops, tablet computing devices, DVD devices, or other devices suitable for rendering video assets 135 on display device 121. Many additional client devices 134a and tablet computing client devices 134b, and smartphone client devices 134n can be used with tracking collection system 100, although only one of each such client device 134 is illustrated in FIG. 1. In an embodiment, a client device 134 may be integrated with a display device 121, so that the two form a single, integrated component. Client devices 134a-n can include any suitable computing devices for communicating via network 106 and executing video player 136.

Embodiments of tracking collection system 100 allow for efficient and substantially real-time, event tracking and collection by periodically invoking optimizer 114, which in turn calls serializer 116 and sender 118 in order to send events 125 from client devices 134 to server 102 in specified intervals. For example, a scheduled task or job could be run each 10 seconds, or in other periodic increments to send tracked events 125 and properties from client devices 134 to server 102. The periodic job could identify collected properties and events related to use (i.e., playback) of video content and ads included in such content in order to provide real-time analytics data to analytics module 108. In alternative or additional embodiments, analytics module 108 can be part of a separate analytics server, system, or platform (not shown), such as, for example, Adobe® Analytics. Such a platform can provide publishers, distributors and advertisers with means for measuring, analyzing, and optimizing distribution of assets 135 and advertisements based on data integrated from online video across multiple distribution channels. Such analytics data can be used by server 102 to quickly identify events related to expired ads (i.e., ads related to promotions, sales campaigns, offers or products that are no longer available) or ads that have depleted their budgets. In cases where system 100 and server 102 are implemented with a Unix-like operating system (OS) this scheduled task or job can be implemented as a cron job that periodically triggers real-time tracking collection engines 120 on client devices 134 to send properties and events 125 to server 102.

As shown in FIG. 1, each of the client devices 134*a-n* can be coupled to sever 102, ad platform 103, and CDN 104 through network 106. As shown in FIG. 1, server 102 can be located separately from database 122. Client devices 134 receive operational commands from users via input devices 130, including commands to initiate downloads of video content and commands to navigate to, select, and view video content via video player 136. A remote control (not shown) or other input device 130 may be used to control operation of STB client device 134. Some STBs may have controls thereon not requiring the use of a remote control. The remote control is configured with buttons to control a STB client device 134, including play a video, order a video asset (i.e., a pay-per-view VOD asset), add a video asset to a cart, retrieve information about video content, view cart, preview similar video content (i.e., more like this), etc. In an embodiment, the cart is a convenient storage location for quick access to video assets a user of video player 136 is likely to eventually want to order, wherein ordering initiates delivery of the ordered video asset 135.

It is to be appreciated that CDN 104 could provide renditions of any type of audio/visual content. Video playing and viewing sessions as described herein refer to any video content that is, generally, available for delivery to an individual client device 134, with delivery initiated upon an explicit request from that client device 134. Video viewing sessions may also be referred to as a "session" herein. Server 102 may also be referred to as a "server" herein. In an example, a video viewing session is one or more of a video content viewing session or a video game session wherein video game assets can be previewed and ordered. In a video viewing session, CDN 104 may provide an asset 135, via network 106, corresponding to video content stored in database 122 or remotely at a publisher's web server. The asset 135 will include one or more ads inserted by ad resolver 110. In a video game session, CDN 104 can run a video game, for example, and allow a client device 134 to play a preview of the video game remotely with ads inserted into the preview.

According to an embodiment, tracking collection system 100 displays live, real-time video reports in a user interface (shown in FIG. 7) on display device 121. In embodiments, display device 121 may be one or more of a television, a network-enabled television, a monitor, the display of a tablet device, the display of a laptop, the display of a smart phone, or the display of a personal computer. In an embodiment, one type of client device 134 is a cable STB connected to a display device 121. In this embodiment, display device 121 may be a television or monitor connected to an STB client device 134.

Server 102 can receive events 125*a-n* from client devices 134*a-n* via network 106, wherein the events 125*a-n* correspond to playback of selected video content and ads inserted within the video content. Assets 135 distributed to client devices 134*a-n* can include video content with inserted ads matched to the content. In embodiments, as a video asset 135 is being played at a particular client device 134, an ad insertion mechanism (see, e.g., ad insertion mechanism 240 in FIG. 2) inserts ads previously matched to the video asset 135 by ad resolver 110, where the matching is based in part on characteristics of the particular client device 134. Assets 135 and copies thereof may be resident in any suitable computer-readable medium, database 122, memory 124, and/or memories 128*a-n*. In one embodiment, the collected events 125*a-n* can reside in memory 124 of server 102. In another embodiment, the events 125*a-n* can be stored in a remote data store accessible from server 102 via network 106. Similarly, assets 135 can be accessed by server 102 from a remote location via CDN 104 and/or be provided to client devices 134*a-n* via CDN 104.

In one embodiment, a particular rendition of an asset 135 is provided in a resolution compatible with a particular display device 121*a-n* of a client device 134*a-n* that requested the video asset 135. Specific renditions of video assets 135 can include the requested video content encoded at a given bit rate and/or bit size appropriate for the requesting client device 134.

A cluster comprising CMS 101, server 102, ad platform 103 and CDN 104 can include any suitable computing system for hosting video and ad assets 135 (i.e., video content and advertisement content), analytics module 108, ad resolver 110, database 122, and tracked events 125. As shown in FIG. 1, server 102 includes a processor 123 coupled to a memory 124. According to certain embodiments, one or more of CMS 101, server 102, ad platform 103, and CDN 104 may be embodied as separate, respective computing systems. In additional or alternative embodiments, one or more of CMS 101, server 102, ad platform 103, and CDN 104 may be virtual servers implemented using multiple computing systems or servers connected in a grid or cloud computing topology. As described below with reference to FIG. 9, processor 123 may be a single processor in a multi-core/multiprocessor system. Such system can be configured to operate alone with a single server 102, or in a cluster of computing devices operating in a cluster or server farm. Although not shown in FIG. 1 for the sake of simplicity, it is to be understood that CMS 101, ad platform 103, and CDN 104 can each include one or more of their own respective processors and memories.

Network 106 may be a data communications network such as the Internet. In embodiments, network 106 can be one of or a combination of a cable network such as Hybrid Fiber Coax, Fiber To The Home, Data Over Cable Service Interface Specification (DOCSIS), Internet, Wide Area Network (WAN), WiFi, Local Area Network (LAN), ATM or any other wired or wireless network. Server 102 may store and stream video content including but not limited to online video, television programs, television broadcasts/simulcasts, movies, and video games.

CDN 104 can be implemented as a content delivery network or content distribution network. In embodiments where network 106 is the Internet, CDN 104 may be embodied as a distributed system of servers and network-accessible storage devices deployed in multiple data centers accessible via network 106. As shown in the example of FIG. 1, CDN 104 can serve video content such as assets 135 to viewers via network 106. In alternative or additional embodiments system 100 can include multiple CDNs 104, including one or more CDNs 104 that serve video assets 135 directly to client devices 134 without routing via network 106. Besides video assets 135 such as live streaming media and on-demand streaming media, CDN 104 can serve other electronic content, such as, for example, web objects (i.e., text assets, image assets, and scripts), downloadable objects (i.e., multimedia assets, software, and documents), and hosted applications (i.e., cloud-based software for games, e-commerce, and portals).

Client devices 134a-n can establish respective network connections with server 102 via network 106. Video player 136 can be executed at a client device 134 to establish a network connection via network 106 and CDN 104. The network connection can be used to communicate packetized data representing asset requests 132, video assets 135, and events 125 between the client device 134 and server 102. Client devices 134a-n can each provide respective sets of tracked events 125a-n corresponding to playback of video assets 135 and inserted advertisements. Server 102 can provide, via CDN 104, video assets 135 with inserted ads in response to requests for the video content from client devices 134a-n. For example, sever 102 can provide, via CDN 104, a rendition of a video asset 135 as streaming audiovisual content. Video player 136 can access the streaming audiovisual content by retrieving one or more of events 125a-n via network 106. CDN 104 can provide a rendition as packetized data. Video player 136 can configure the processor 126 to render a video asset 135 for display on display device 121.

Exemplary Architecture

FIG. 2 is a block diagram depicting an exemplary architecture 200 for a tracking collection system. In particular, FIG. 2 illustrates components of an exemplary client-side architecture. FIG. 2 is described with continued reference to FIG. 1. However, FIG. 2 is not limited to that exemplary embodiment.

As shown in FIG. 2, architecture 200 includes a video player 136 formed from components including a core player 238 and an ad insertion mechanism 240. In the non-limiting embodiment shown in FIG. 2, video player 136 includes a core player 238 implemented and built using the Adobe® Primetime software development kit (SDK) and the ad insertion mechanism 240 uses Adobe® Auditude advertisement insertion classes. In this embodiment, tracking collection can be made available as a service for real-time video tracking by the Adobe® Primetime SDK and ad insertion mechanism 240 can use the Adobe® Auditude video advertising platform. In cases where video player 136 is a browser-based application, ad insertion mechanism 240 can include an ad insertion plug-in configured to retrieve and insert ads as video content is being viewed. Such an ad insertion plug-in can also be configured to retrieve ad properties (i.e., as ad metadata) along with ads from an ad server (see, e.g., ad server 422 in FIG. 4), and trigger certain ad-related events, such as for example, ad start, ad play, and ad complete events.

Architecture 200 also includes a reporting layer 242 configured to provide all needed events and properties for real-time analytics classes as well as other data for application measurement (i.e., AppMeasurement). Architecture 200 further includes real-time tracking collection engine 120 configured to track real-time video analytics (RTVA). Real-time video analytics engine 120 receives events 125 from reporting layer 242 and groups them together to send them to a tracking server or a software as a service (SaaS) infrastructure, such as, for example, a SaaS infrastructure that includes software for aggregation functions.

An embodiment of architecture 200 uses reporting layer 242 as a reporting provider and real-time video analytics engine 120 as an RTVA tracker. Reporting layer 242 is configured to listen for all events 125 coming from core player 238 and to dispatch the events 125 in a unitary manner to real-time video analytics engine 120 in accordance with defined libraries or classes, such as, for example real-time video analytics classes. In embodiments, real-time video analytics engine 120 listens for events 125 provided by reporting layer 242. In additional or alternative embodiments, there other libraries (not shown) can listen for reporting events.

Embodiments of reporting layer 242 can listen for events 125 such as, but not limited to: MediaPlayerStatusChangeEvent.MEDIA_PLAYER_STATUS_CHANGE, MediaErrorEvent.MEDIA_ERROR, MediaPlayerEvent.MEDIA_PLAYER_PLAY_START, MediaPlayerEvent.MEDIA_PLAYER_PLAY_COMPLETE, and MediaPlayerEvent.MEDIA_PLAYER_ITEM_REPLACE. The MEDIA_PLAYER_ITEM_REPLACE event may be issued when a new video asset 135 is loaded in the same video player 136 automatically.

Reporting layer 242 can also be configured to listen for QoS events such as, for example, BufferEvent.BUFFERING_START, BufferEvent.BUFFERING_END, BitrateChangeEvent.BITRATE_CHANGE, AdEvent.AD_STARTAdEvent.AD_COMPLETE, and QoSEvent.QOS_INFO.

The reporting layer 242 can also dispatch or report events 125 such as, but not limited to: ReportingEvent.START, ReportingEvent.PLAY, ReportingEvent.PAUSE, ReportingEvent.COMPLETE, ReportingEvent.BUFFER_START, ReportingEvent.BUFFER_END, ReportingEvent.AD_START, ReportingEvent.AD_COMPLETE, ReportingEvent.BITRATE_CHANGE, and ReportingEvent.ERROR. In an embodiment, the reporting layer 242 uses a private class that is not publicly exposed.

Real-Time Tracking Collection Engine

Real-time tracking collection engine 120 is component of architecture 200 configured to listen for events 125 and other real-time video analytics (RTVA) data provided by reporting layer 242. As shown in FIG. 2, real-time tracking collection engine 120 includes collector 112, optimizer 114, and serializer 116 for performing the following functionalities: collection, optimization, serialization, and sending events 125 to a tracking server, such as server 102.

First, real-time tracking collection engine 120 will collect the events in a collector timeline. This collection is performed by collector 112. Next, at specific time interval, optimizer 114, takes events from collector 112 and forwards them to serializer 116. Serializer 116 then serializes the events and forwards the serialized event data to sender 118, which in turn sends the serialized events data to a server. The serialized events can be sent to a tracking server, such as server 102, and/or a separate analytics server. According to an embodiment, real-time tracking collection engine 120 needs the following setup details in order to be able to send events 125 to a tracking server: an indication of a real-time tracking server and a real-time job identifier (i.e., a job ID). A user of architecture 200 may not need to know these setup values in advance and may manually provide them. In embodiments, the values can be populated programmatically. Alternatively, the setup values can be received as input, manually added into program code, or read from a configuration file.

In accordance with embodiments, each tracking item and event 125 to be optimized by optimizer 114 and sent to a tracking server, such as server 102, can include data indicating one or more of following: user characteristics (i.e., user profile data), client device 134, user country, user city, user latitude, and user longitude. In one embodiment, an Internet Protocol (IP) address of a client device 134 can be obtained, which can then be used to resolve the country, city, latitude, longitude on server 102.

According to embodiments, video asset data can also be sent with events 125. For example, such asset data can include one or more of the following data items: a video identifier (video ID), an asset ID (for either a video or an ad placed within a video), an asset type (i.e., VOD, live video, linear broadcast, or advertisement), a publisher ID, stream information, bitrate (i.e., a current bitrate given by a video player 136), and a content delivery/distribution network (CDN) ID. In one embodiment, the CDN ID can be a CDN name provided by an application implementing CDN 104.

Real-time tracking collection engine 120 can be implemented as a set of classes that implement real-time tracking of video events 125. An exemplary real-time tracking collection engine 120 can be formed out of the four main parts/components shown in FIG. 3 and described below.

A collector 112 can be implemented as a module to create a chained list of events 125. Collector 112 can include processes and methods for collecting events 125 and adding data representing the collected events to a list.

Optimizer 114 can be implemented as a module or process to optimize the collected data (i.e., the event data collected by collector 112). Optimizer 114 can be configured to periodically execute or run at a specific, tunable interval. In accordance with embodiments, the interval can be set and changed by an administrator or other authorized user as a configuration option for optimizer 114. In one embodiment, a default interval is 10 seconds and optimizer 114 is executed every 10 seconds.

A serializer 116 can be implemented as a module configured to structure the collected events and their associated data as needed for use on a destination server, such as for example, server 102. Serializer can structure events 125 in a format to be received and read by a server-side environment on a tracking server and/or an analytics server.

Sender 118 implements a method of sending all information serialized by serializer 116 to a server by making the necessary send calls. The functionalities of collector 112, optimizer 114, serializer 116 and sender 118 are described in greater detail below with reference to FIG. 3.

Figure 5:
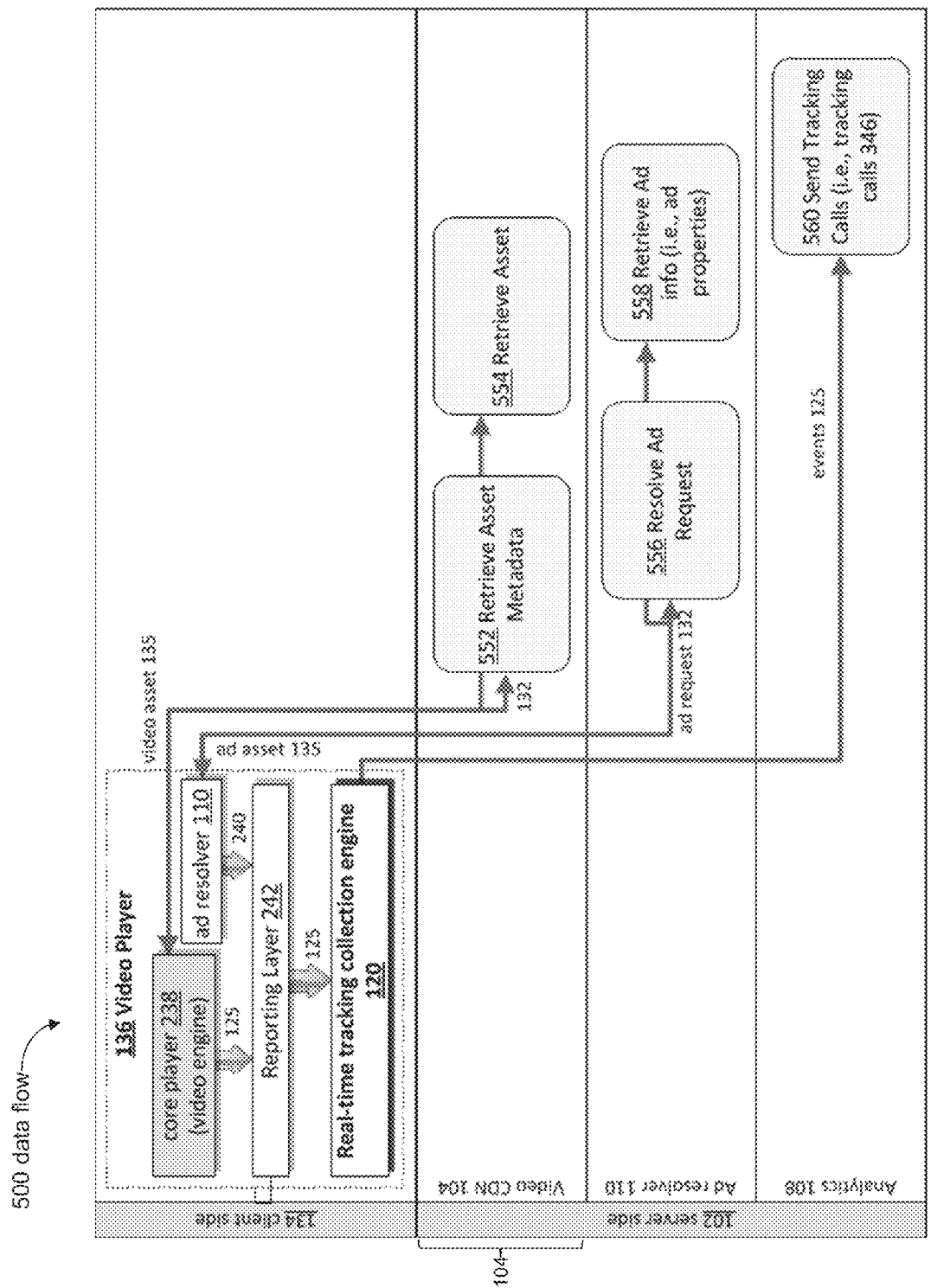
FIG. 5 depicts real-time video analytics dataflows between client-side and server-side components, in accordance with embodiments.

As shown in FIGS. 1 and 2, a client device 134 (i.e., the client side) can trigger playback events that are collected by a real-time tracking collection engine 120 and sent by sender 118 as events 125 that a server 102 (i.e., the server side) can use for video analytics and reporting. The information needed for such analytics and reporting can be gathered from different layers in a video player. In the examples of FIGS. 2 and 5, some of this information is gathered from a core player 238 and some from an ad insertion mechanism 240 through a standardized interface, reporting layer 242, that enables easy access to the gathered information.

Real-time tracking collection engine 120 represents the tracking classes that do data collection, data optimization and serialization, and contains specific algorithms to make real-time tracking available.

The process of sending real-time tracking is decoupled from player events occurring in video player 136. Except for certain out-of-band events, such as error events, embodiments collect all other tracked events and then send the collected events to a server-side infrastructure in an optimized way. As shown in FIG. 1, the workflow for this event collection, optimization, and sending can be performed by collector 112, optimizer 114, serializer 116 and sender 118 so that events 125 are sent from client devices 134 to a server-side infrastructure hosted by server 102.

According to embodiments, there are at least two types of events: collected events and out-of-band events. Collected events include video asset events, ad events and QoS events. Exemplary video asset events can include, but are not limited to, play, stop, pause, and close. Ad events can include events, such as, for example, ad start and ad complete. Ad events can be triggered by an ad insertion plug-in included in video player 136. QoS events can include, for example, buffering start, buffering end, and bitrate switching events. Out-of-band events are mainly represented by errors. Embodiments do not collect out-of-band events and instead send such events directly to an analytics server. In embodiments, video asset, ad, and QoS events events are triggered through a standardized interface, their properties are updated, and real-time tracking collection engine 120 invokes modules 112, 114, 116 and 118 to collect, optimize, serialize and send the events to server 102.

Exemplary Workflow

Figure 3:
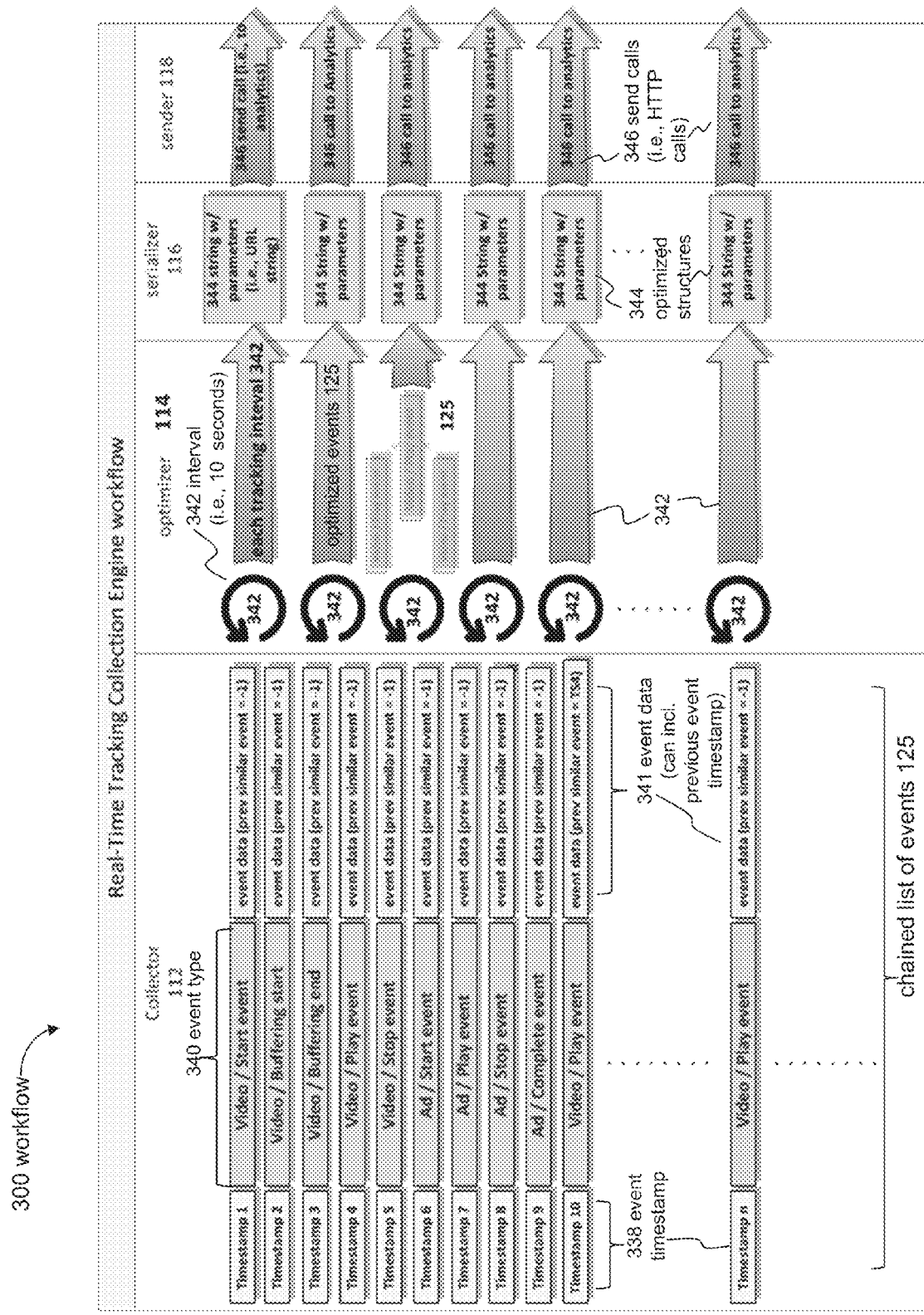
FIG. 3 depicts a workflow for real-time video analytics performed by components of a real-time tracking collection engine, in accordance with embodiments.

FIG. 3 depicts an exemplary workflow for tracking collection. FIG. 3 is described with continued reference to FIGS. 1 and 2. However, FIG. 3 is not limited to those exemplary embodiments.

FIG. 3 depicts a client-side workflow 300 that can be carried out by components of tracking collection system 100 and architecture 200. Workflow 300 begins when video player 136 starts playing a video asset 135. FIG. 3 illustrates the workflow 300 from the start of video playback in video player 136 to events 125 being gathered into classes by real-time tracking collection engine 120, which will start sending tracking calls as needed.

In embodiments, video player 136 can be implemented using a browser and the video asset 135 can be defined or identified by a Uniform Resource Locator (URL). In certain embodiments, the video asset 135 can be additionally defined by metadata, such as, for example a video ID retrieved from a content management system (CMS) accessible from a client device 134.

Next, if available and needed, ad insertion mechanism 240 inserts advertisements into the video asset and provides the necessary events and properties for the inserted advertisements. The availability and need for advertisements can be determined by invoking ad resolver 110.

While playing a video asset 135, tracking events are triggered through the standardized interface to the real-time tracking collection engine 120. As shown in FIG. 3, targeted latency for optimizing events 125 can be a defined tracking interval 342. In the non-limiting embodiment shown in FIG. 3, tracking interval 342 can be set to 10 seconds, which means that every 10 seconds, tracking calls will be sent by sender 118 to a tracking server.

In embodiments, two kinds of tracking items can be tracked and collected as part of workflow 300, namely, events 125 and errors. In certain embodiments, events 125 can contain one or more of the following data items: an event type 340 (i.e., video start, video buffering, video play, ad start, and ad play), an event count (i.e., number of occurrences of an event), an event duration (i.e., duration of an event in seconds or minutes), a total count of events (i.e., a cumulative total number of events), and an event total duration. The event total duration can represent a cumulative total duration of events for a given video asset or a session of a video player 130

Errors can contain data indicating: an error source (i.e., internal to core player 238 or external errors encountered by video player 136), an error ID, a user, a video asset 135, and stream information. In an embodiment, events 125 will be sent at tracking intervals 342 as triggered by optimizer 114, whereas errors will be sent out-of-band, at the moment each error is encountered. This is done because reaching an error state may cause video player 136 to become unstable and result in sender 118 being unable to send optimized calls. According to one embodiment, external errors will not stop the real-time tracking collection engine 120 and further error events will be continuously sent, whereas internal errors will stop real-time tracking collection engine 120 in cases where an internal error is determined to be a fatal/critical/unrecoverable error. An embodiment provides an API to track external errors with means for protecting stability of video player 136.

Before workflow 300 begins, an initialization of real-time tracking collection engine 120 may be performed. The initialization can use a public error reporting API in order for client devices 134 to be able to track errors external to core player 238. One embodiment provides the following error tracking method: player.rta.trackError(errorId). This method will send the error to real-time video analytics sever-side infrastructure (i.e., hosted on server 102) as an external error type.

Remote Setup and Emergency Stop

Workflow 300 can be configured for remote setup and emergency stop. For example, a real-time analytics (RTA) library includes remote setup and emergency stop features. Remote setup can trigger remote setup of real-time tracking collection engine 120 on a client device 134 from a remote device, such as server 102. Remote setup represents a means for remotely changing the tracking setup of a set of video players 136 implementing real-time tracking collection engines 120 on client devices 134.

Emergency stop of a real-time tracking collection engine 120 on a given client device 134 can be initiated by server 102 if parameters received from that client device 134 have reached some predefined threshold values. When such an emergency stop is carried out, tracking of events 125 ceases on the client device 134.

According to embodiments, the following options or parameters can be changed as needed: tracking interval 342, which indicates the interval at which optimizer 114 runs and calls are made by sender 118; track external errors, which indicates whether external errors are tracked or not; and setup check interval, which indicates the interval at which the setup options are checked. Server 102 can be configured to render an administrator UI usable to update a tracking interval 342 for a given real-time tracking collection engine 120 as needed. By decrementing or incrementing tracking interval 342, the frequency of optimization performed by optimizer 114 on a client device 134 hosting a real-time tracking collection engine 120 can be controlled remotely. By setting track external errors to false (i.e., 0), server 102 can remotely stop tracking of external errors on a client device 134. For example, if external errors are being tracked through an external error API as a result of track eternal errors having been set to true (i.e., 1), an administrator UI on server 102 can be used to set the track external errors parameter to false in order to cease tracking of external errors via the external error API. Server 102 can also be configured to set and update a setup check interval in order to remotely control the interval at which a client device 134 is queried for tracking setup information.

An analytics server or analytics module 108 can provide the above settings in an XML format to update the tracking as needed. For example, an embodiment of workflow 300 implements a method which retrieves real-time video analytics tracking setup parameters. This method queries an endpoint client device 134, retrieves the contents of the tracking setup parameters, and sets an RTA parameter accordingly. In embodiments, server 102 can retrieve setup parameters as setup data from a client device 134 via code similar to the following an Extensible Markup Language (XML) code example:

```
<?xml version="1.0"?>
<setupData>
    <trackingInterval>10</trackingInterval>
    <trackExternalErrors>1</trackExternalErrors>
    <setupCheckInterval>300</setupCheckInterval>
</setupData>
```

In the above code example, trackingInterval is an integer representing seconds for tracking interval 342, which is the interval that tracking calls are sent by sender 118. Setting trackingInterval to 0 on a client device 134 means that tracking will be stopped on that client device 134. With continued reference to the above code example, trackExternalErrors is a Boolean value where 1 is true and 0 is false. The trackExternalErrors setting instructs a real-time tracking collection engine 120 to enable/disable its external error tracking API. The setupCheckInterval is an integer representing seconds and is the interval controlling when setup calls are to be made. In one embodiment, the setupCheckInterval is set to be larger than the trackingInterval to ensure that setup calls are made less frequently than tracking calls. This may be done to avoid performance issues that may arise due to having setup calls that are simultaneous to or overlapping with tracking calls.

When classes for real-time tracking collection engine 120 are instantiated, first, workflow 300 obtains the setup data. When the setup data is retrieved, the real-time tracking collection engine 120 is updated as needed to use the setup data. If setup data is not available, embodiments use default setup values. In certain embodiments, the default values are: a 10 second tracking interval 342, default value of 1 for track external errors—meaning that by default, tracking external errors through an API is allowed; and a check status interval default value of 1 minute. At an interval time specified by the check status interval, real-time tracking collection engine 120 fetches the setup data again and adjusts the setup properties accordingly.

These setup properties can be used to tweak different real-time tracking approaches on different client devices 134 depending on their needs and can be adjusted at runtime as needed. To handle special cases like flooding, high rate errors from multiple users or video players 136, and other similar cases, embodiments can use the emergency stop mechanism. This mechanism can comprise two parameters: disable tracking of external error tracking by setting track external errors to 0 (false) in order to disable tracking in response to determining that a video player 136 is sending many errors; and stop real-time tracking by setting tracking interval to 0 seconds if too many send calls 346 are received at tracking time. The tracking interval may be set to 0 seconds in response to detecting improper usage of real-time video analytics properties that results in flooding of a server 102 with events 125 from excessive send calls 346.

For both remote setup and emergency stop updates based on a set of players can be pushed up to that specific group of players. This group of players can be defined by: publisher, player name, version, etc. thus the real-time tracking collection engine (client-side) is retrieving the setup data for its properties. The properties and values that defines a video player group should be defined on both client and server sides.

In order to be able to calculate the metrics above, embodiments track different events and properties associated with use of assets in a video player 136. Exemplary events 125 include start events, play/pause events, buffering events, bitrate switching events, and error events. Exemplary properties include a video identifier (ID), an advertisement ID, a cost per mille/cost per thousand advertising impressions (CPM) hash value for an advertisement, a current bitrate, an error ID, a start-up time (i.e., for video player 136), and a buffer time.

In order to stop tracking remotely (i.e., remotely from client devices 134), an embodiment includes an external configuration mechanism. The external mechanism can be implemented in tracking collection system 100. The external configuration mechanism can be configured to periodically interrogate or query server 102 for new and updated tracking settings. The query can be executed at a specific, tunable interval. The query can be based on parameters so that tracking collection system 100 can change and/or stop tracking on specified types of client devices 134 and/or video players 136 instead of all client devices 134 that are configured for real-time analytics (i.e., client devices having a real-time tracking collection engine 120). An embodiment enables changing the optimizer interval for a specified client device 134. For example, this embodiment can employ the external configuration mechanism to change the optimizer 'heartbeat' interval from a default value of 10 seconds to 30 seconds for a specific client device 134 and/or video player 136.

Real-time tracking collection engine 120 can be implemented as a set of classes that implement real-time tracking of video events 125. An exemplary real-time tracking collection engine 120 can be formed out of the four main components shown in FIG. 3 and described in the following paragraphs.

Collector 112 can be implemented as a module to create a chained list of events 125. Collector 112 can include processes and methods for collecting events 125 and adding data representing the collected events to a list. As shown in the example embodiment of FIG. 3, for each event 125, collector 112 can populate a corresponding entry in a chained list with an event timestamp 338, an event type 340, and event data 341 including a previous event timestamp. An event timestamp 338 represents a time when an event occurred. The list of events 125 can be sorted chronologically or indexed by event timestamps 338. In certain embodiments event timestamps 338 and previous event timestamps are Coordinated Universal Time (UTC) values. Event types 340 indicate a category of events 125. In the example provided in FIG. 3, event types 340 can include, but are not limited to, video start events, video buffering events, video play events, ad start events, and ad play events.

As shown in FIG. 3, the first occurrence of an event 125 of a given event type 340 in the list will have a −1 value in a previous event timestamp stored in event data 341. According to an embodiment, as an event 125 is being added to the list, collector 112 determines if an event with a similar event type 340 has previously occurred. If so, collector 112 populates the previous event timestamp in the event data 341 for the event being added with the value of the event timestamp 338 of the previous event. For example, FIG. 3 shows that when a second occurrence of a video play event occurs at timestamp 10, the previous event timestamp in that event's event data 341 is set to 'TS4', which is the value of event timestamp 338 for the first occurrence of a video play event in the list. In cases where a new event 125 is being added to a list including multiple, prior events 125 with similar event types 340, collector 112 can determine a previous event timestamp for the new event 125 by comparing event timestamps 338 for the multiple existing events to the event timestamp 338 of the new event 125 being added to the list and populating event data 341 for the new event with a previous event timestamp value equaling the event timestamp 338 of the most-recent of the prior events 125.

Optimizer 114 can be implemented as a module or process to optimize the collected data (i.e., the event data collected by collector 112). Optimizer 114 can be configured to periodically execute or run at a specific, tunable interval. In accordance with embodiments, the interval can be set and changed by an administrator or other authorized user as a configuration option for optimizer 114. In one embodiment, a default interval is 10 seconds and optimizer 114 is executed every 10 seconds.

Serializer 116 can be implemented as a module configured to structure the collected events and their associated data as needed for use on a destination server, such as for example, server 102. In the example embodiment of FIG. 3, serializer 116 can implement a method for formatting or structuring collected events 125 into optimized structures 344. As shown, such structures 344 can be formatted as strings with parameters, including, for example, URL strings to be received and read by a server-side analytics module 108.

Sender 118 can be implemented as shown in FIG. 3 as a method of sending all serialized event information to a server by making the necessary hypertext transfer protocol (HTTP) calls.

According to embodiments, the components shown in FIG. 3 are connected and can be configured to perform their respective workflow tasks substantially concurrently. Triggered events 125 are added to a chained list of events by collector 112 and are assigned event time stamps 338 representing the current time. At the same time, workflow 300 keeps track of a previous event having a similar event type 340, so that as each event 125 is added to the list, is is related to or chained with the previous event 125 with the similar event type 340. This relationship or chaining creates a chained list of events 125, which facilitates accessing one event 125 and at the same time being able to quickly access the previous similar type of event 125 in the list. Events 125 are collected by collector 112, and for real-time tracking, workflow 300 uses substantially constant tracking calls that inform real-time tracking collection engine 120 of current status of a user and the user's video experience. The video experience is based on use of a video asset 135 and its inserted ads within video player 136. After collector 112 has collected tracking data for events 125, optimizer 114, serializer 116, and sender 118 perform their respective jobs or tasks at a specific interval (i.e., tracking interval 342 shown in FIG. 3).

According to workflow 300, when playback of a video asset 135 starts in video player 136, events 125 start being collected by collector 112 and optimizer 114 subsequently starts optimizing the collected events to be sent at tracking interval 342. Then, serializer 116 formats and serializes the event data, and sender 118 creates and issues calls containing all events 125 that have been tracked since the last tracking interval 342. In this way, workflow 300 periodically sends events 125 to a server-side infrastructure. The server-side infrastructure can be hosted on tracking servers such as server 102 and/or analytics servers.

Optimizer 114 gets event data from collector 112 and optimizes the events 125 to create optimized events before passing them onto serializer 116. As shown in FIG. 3, collector 112 keeps the events in order as they arrive, then optimizer 114 periodically goes though the collector 112 to select events 125 added or updated since the last tracking interval 342 and optimizes the selected events 125. Optimizer 114 is configured to, at specified tracking interval 342, optimize the collected events 125 so that there are fewer calls and the event data is still provided close enough in time to occurrence of events so that server 102 can compute the needed analytics reports. From the video player 136, collector 112 receives many events 125 with data attached. In an embodiment, events 125 are periodically optimized by optimizer 114 and then serialized into optimized structures 344 by serializer 116 using the following steps:

1) grouping events 125 by the following keys: asset type, video ID and event type 340—resulting in one event 125 for each group, potentially including multiple calls for each tracking interval 342; and 2) grouping events 125 generated in video player 136 into one send call 346 for each tracking interval 342—this results in one call 346 per tracking interval 342 due to events 125 being serialized by serializer 116.

In an embodiment, step 1) above is performed by optimizer 114 so that events 125 received from the same asset type, the same video ID, and the same event type 340 are bundled together into one single item (i.e., an optimized event) that will be sent only once per tracking interval 342. For example, for step 1), if, during the last tracking interval 342, collector 112 received five total events 125 comprising three play events 125 and two buffering events 125, five separate events 125 are added to the chained list by collector 112. These five events 125 can be optimized by optimizer 114 into two optimized events: one being a play event and one being a buffering event. From this, using the step 2) above, serializer 116 serializes the two optimized events 125 into one single optimized structure 344. Next, sender 118 creates and issues a single send call 346 for this structure 344. FIG. 3 illustrates how, at each tracking interval 342, optimized events 125 can be created using step 1). For example, at the third 10-second tracking interval 342 shown in FIG. 3, two video play events 125 are optimized by optimizer 114 into a single video play event 125 and then passed onto serializer 116. FIG. 3 also shows how step 2) can be performed by serializer 116 in that same tracking interval 342 to produce an optimized structure 344 corresponding to the single optimized event 125. As shown, serializer represents the optimized event 125 in an optimized structure 344 embodied as a string with parameters.

In embodiments, each optimized structure 344 may contain one or more of the following properties: user information, asset information, stream information, and event information. According to embodiments, the user information can include one or more of a name of a video player 136, a player version identifying a version of a browser or video player 136 installed on a user's client device 134, and/or a universally unique identifier (UUID) for a user's client device 134. The stream information can identify a bitrate, a CDN 104, and/or a stream name. In embodiments, the asset information can be embodied as asset metadata identifying one or more of: an asset type such as a video category or genre; an asset publisher such as a studio, network, or distributor; a video identifier such as a unique ID or reference to an asset; a video name such as an asset title; an advertisement identifier (ad ID); a cost per impression (CPM) for an advertisement; and an advertisement name. Non-limiting examples of asset types include video categories such as live video, pay per view, streaming video, and VOD and genres such as sports, entertainment, and news. The event information can include, for example, an event type 340, an event timestamp 338, and event data 341 such as, but not limited to, an event count, an event total count, an event duration, an event total duration, and/or a previous event timestamp.

Video Advertising System

Figure 4:
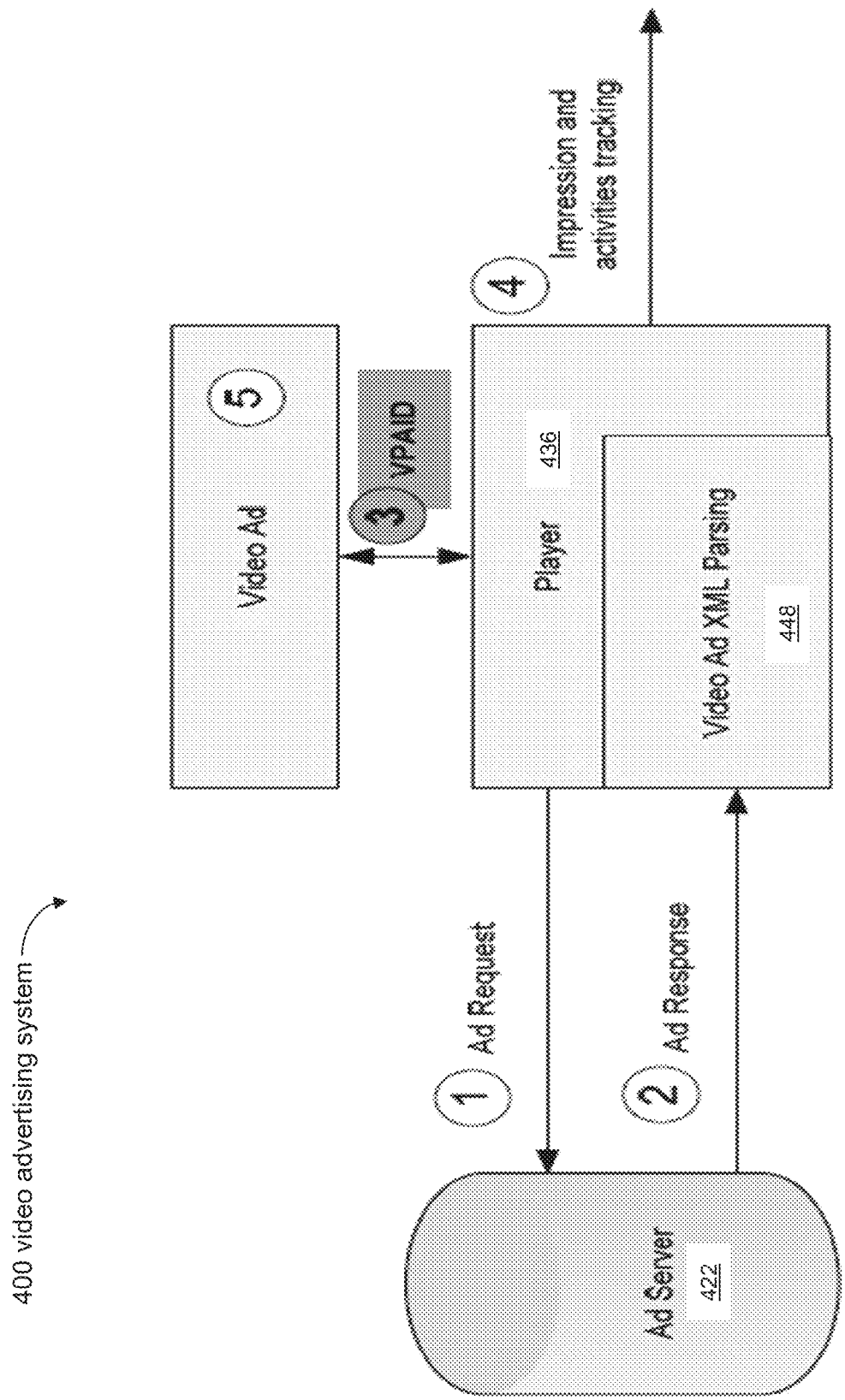
FIG. 4 is a block diagram illustrating communications flows between components of a prior art system for processing in-stream video advertisements displayed in a digital video player.

FIG. 4 illustrates communications flows between components of a prior art system for processing in-stream video advertisements displayed in digital video players. In particular, FIG. 4 depicts a video advertising system 400 that implements pre-defined standards for playing advertisements inside a video player 436 along with certain video content. A system such as video advertising system 400 may form part of ad platform 103. FIG. 4 shows that at least five enumerated steps are required for video advertisement ('ad') flows in video advertising system 400. As described below, video advertising system 400 also requires multiple interface points as part of the communication flow for providing ads from a standards compliant video advertisement server 422. Advantages of tracking collection system 100 include providing the substantially real-time tracking collection features discussed above with reference to FIGS. 1-3 and below with reference to FIGS. 5-9 without necessarily requiring all of the steps and multiple interface points required by video advertising system 400.

Video advertising system 400 requires protocols that make it possible to show both a video and separate ad media inside video player 436. FIG. 4 illustrates how video advertising system 400 is implemented using such protocols. Advantages of tracking collection system 100 include the ability to perform real-time tracking and collection of events related to playback of video content including ad assets 135 resolved by ad resolver 110 and inserted by ad insertion mechanism 240. In this way, embodiments disclosed herein can track and collect events 125 associated with video content and ads as the events occur without necessarily requiring protocols such as those used in video advertising system 400.

As shown in FIG. 4, in video advertising system 400, the flow for placing a video ad requires several steps and interfaces. In step 1, a video player 436 submits an ad request by making an ad call to a dedicated ad server 422. Then, in step 4, ad server 422 responds with an Extensible Markup Language (XML) file including a reference to ad media, and a video ad XML parsing module 448 parses the XML file to retrieve the reference to the ad media. In contrast to video advertising system 400, another advantage of tracking collection system 100 is that property evaluations can be used by ad resolver 110 to automatically resolve ads to be placed in video content. Next, in step 3, video player 436 retrieves ad media referred to in the XML file and renders the ad media. According to video advertising system 400, displaying ad media typically requires a set of parameters from video player 436, which can require interaction between the video ad XML parsing module 448 and video player 436 using an application programming interface (API). In video advertising system 400, an API is required for any pre-roll ad media that runs a script or any interactive, clickable ad media. In step 4, video player 436 fires impression and activity reporting beacons. Unlike the tracking collection systems and methods disclosed herein, step 4 and other steps shown in FIG. 4 do not perform real-time tracking and collection of analytics and events associated with playback of videos and ads inserted within the videos in video player 436. Lastly, in step 5, the ad media is rendered.

Figure 8:
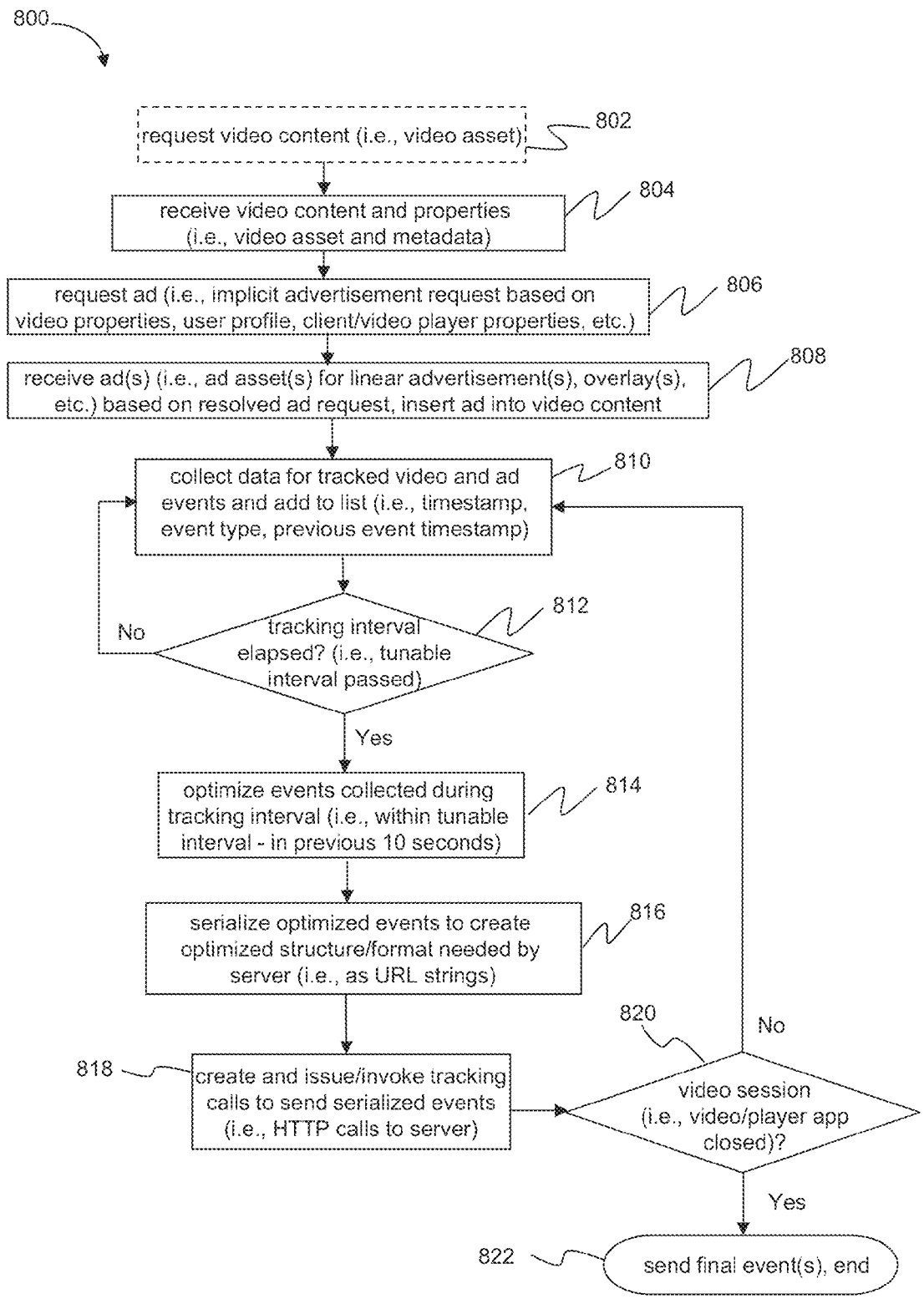
FIG. 8 is a flow chart illustrating an example method for collecting tracked events associated with video content playback, in accordance with embodiments.

In video advertising system 400, a protocol between video player 436 and the ad is required. The protocol includes methods that the advertisement must implement, and video player 436 must call the methods when certain events occur. Examples of such methods are resizeAd, startAd, stopAd, pauseAd, resumeAd, collapseAd, expandAd. In video advertising system 400, an ad can only implement special behavior, such as resizing, when a method is explicitly called. For example, when the screen size on which an ad appears changes, an ad must dynamically choose its layout depending on the available area by implementing this functionality in the resizeAd method. Other advantages of tracking collection system 100, architecture 200, and method 800 described below with reference to FIG. 8 is that the system and methods do not require the protocol or method calls needed in video advertising system 400.

Exemplary Dataflows

Figure 6:
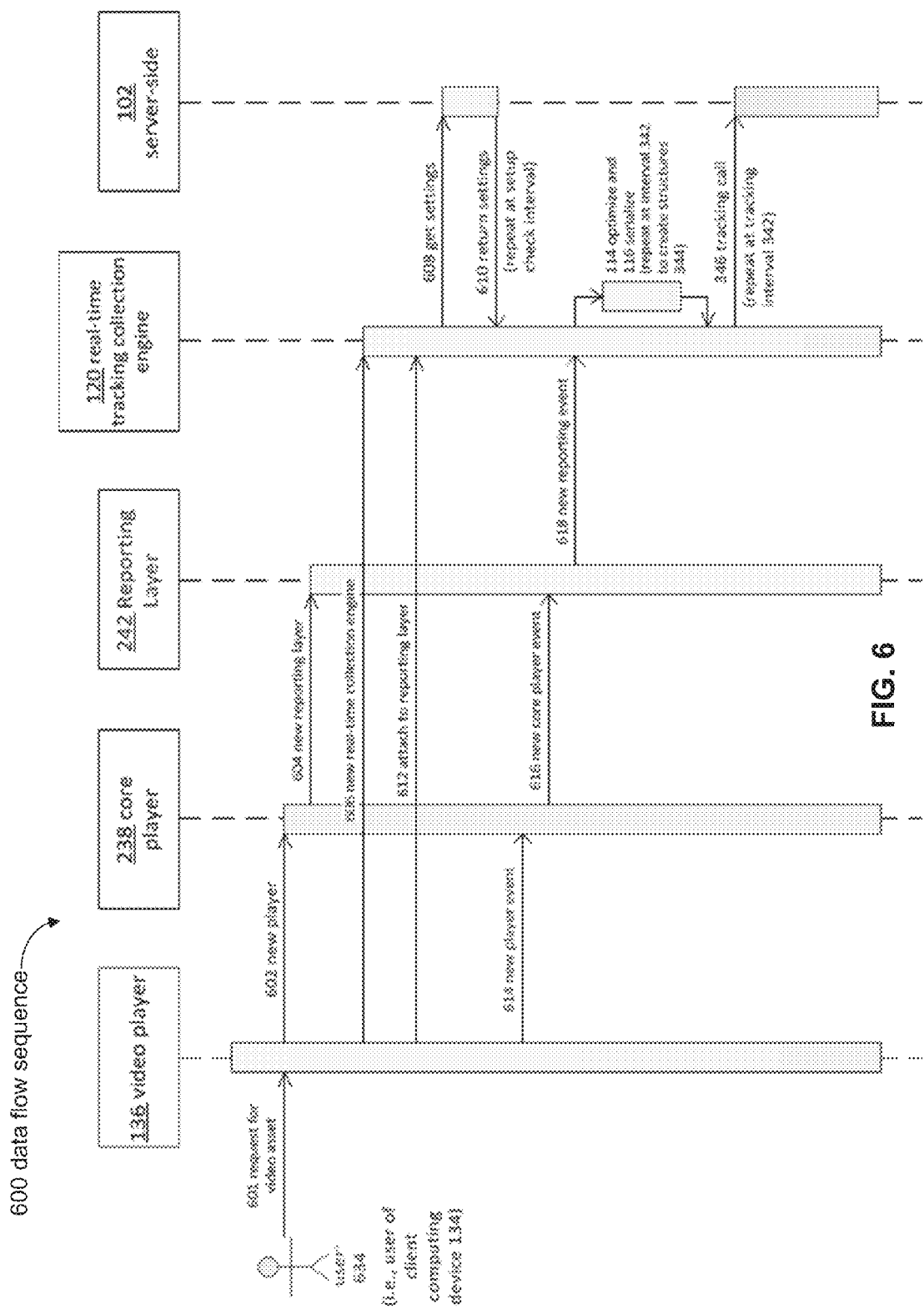
FIG. 6 is a sequence diagram of dataflows for setting up and performing real-time video analytics using client-side and server-side components, in accordance with embodiments.

FIGS. 5 and 6 show dataflows for exemplary real-time tracking implementations. FIGS. 5 and 6 are described with continued reference to FIGS. 1-3. However, FIGS. 5 and 6 are not limited to those exemplary embodiments. Certain implementations integrate the components shown in FIGS. 5 and 6 so that the components work seamlessly together to exchange data and messages used for real-time video analytics.

FIG. 5 depicts dataflow between client-side and server-side components used for real-time video analytics. In particular, FIG. 5 illustrates dataflow 500 between client-side components on a client device 134 and server-side components hosted on server 102 and a CDN 104. As shown, a video player 136 hosted on client device 134 can be formed of a core player 238, a client-side ad resolver 110 component, an ad insertion mechanism 240 and a reporting layer 242. In certain embodiments, reporting layer 242 can use real-time video analytics classes and the client-side ad resolver 110 component uses an ad-insertion plug-in as ad insertion mechanism 240.

In response to user selection of video content in video player 136, core player 238 can send a video asset request 132 to video CDN 104. In additional or alternative embodiments, this asset request 132 for a particular video asset 135 may sent from client device 134 to server 102 and then routed to CDN 104 (see, e.g., FIG. 1). Upon receipt of asset request 132, CDN 104 performs step 552 to retrieve metadata for the requested video content and then performs step 554 to retrieve a video asset 135 corresponding to the video content indicated in asset request 132. At this point, CDN 104 sends the retrieved video asset 135 to core player 238.

Next, the client-side ad resolver component 110 sends an ad asset request 132 (i.e., an ad request) to the server-side ad resolver 110. This ad asset request 132 may be triggered implicitly based at least in part on properties of the video asset 135, such as the metadata retrieved in step 552. The ad asset request 132 can also be based in part on properties of video player 136, properties of client device 134, and/or properties of a user of client device 134. After receiving the ad asset request 132, the server-side ad resolver 110 resolves the ad request in step 556 according to one or more of the above-noted properties and based on available ads. Available ads are identified by server-side ad resolver 110 by retrieving ad information in step 558. The ad information can be retrieved from database 122 shown in FIG. 1. The retrieved ad information can include, but is not limited to, keywords, CPM, cost per placement, number of prior insertions/placements, expiration and remaining budget information for an ad. Based on the ad information (i.e., ad properties), ad resolver 110 resolves ad asset request 132 by matching one or more ad assets 135 with the requested video content. At this point, server-side ad resolver sends the matching one or more ad assets 135 to the client-side ad resolver 110 component, which in turn uses ad insertion mechanism 240 to insert the one or more ad assets 135 into the video content.

As the video content and its inserted ads are used (i.e., played) in video player 136, events 125 related to the playback and interaction with the video and ad assets 135 are tracked in real-time. As shown in FIG. 5, video player 136 includes a reporting layer 242 is configured to listen for events 125 coming from core player 238. Reporting layer 242 is also configured to listen for events 125 related to playback of and interaction with ads inserted into the video content by ad insertion mechanism 240. At this point in dataflow 500, reporting layer 242 dispatches events 125 to real-time tracking collection engine 120. This dispatch can be performed using real-time video analytics classes. As shown in FIG. 5, the events 125 can then be sent from real-time tracking collection engine 120 to analytics module 108 on server 102 by issuing a tracking call 346 in step 560. The tracking call 346 issued in step 560 can be embodied as the send call 346 to analytics described above with reference to FIG. 3.

FIG. 6 is a sequence diagram of dataflow for setting up and performing real-time video analytics using client-side and server-side components. In particular, FIG. 6 depicts a sequence 600 of messages and dataflows for retrieving setup data and how retrieved setup data affects real-time tracking and collection.

Sequence 600 begins in step 601 when a user 634 of a client computing device 134 initiates a request for a video asset 135. As shown, this request for a video asset can be initiated via user 634 interacting with video player 136. Next, in step 602, an indication of a new player (i.e., a new instance, installation, or version of a video player 136) and setup data for the new player is sent to core player 238 for video player 136. In a non-limiting example, step 602 can comprise sending setup data and other properties of video player 136 to a software development kit (SDK) used to configure or build core player 238. For example, core player 238 can be built or instantiated using the Adobe® Primetime SDK. Next, in step 604, setup information for the reporting layer for video player 136 is sent to reporting layer 242. This setup information can identify defined libraries or classes to be used by reporting layer 242.

In step 606, sequence 600 sends settings for configuring a real-time tracking collection engine 120. The a real-time tracking collection engine 120 can be hosted locally on a client device 134 where video player 136 is installed. These settings can include the track external errors setting and the tracking interval 342 described above with reference to FIG. 3. Upon receipt of the settings, in step 608, the settings and setup data and information from steps 602-606 are sent to server 102. Next, in step 608, server 102 returns settings, including any settings changed at server 102, to real-time tracking collection engine 120. As shown in FIG. 6, steps 608 and 610 can be iteratively repeated as specified by defined setup check interval. As described above with reference to FIG. 3, the setup check interval can be set at an appropriate interval in order to configure server 102 to periodically query a client device 134 for tracking setup information (i.e., by performing step 608) and return any updated tracking setup parameters to the client device 134 (i.e., by performing step 610). For example, the setup check interval can be a tunable parameter set to a number of seconds greater than the tracking interval 342 so that steps 608 and 610 will be repeated periodically, but less frequently than tracking calls 346 are made.

At this point in sequence 600, step 612 is performed to notify real-time tracking collection engine 120 that video player 136 is attached to reporting layer 242. Next, in step 614, as tracked events 125 occur in video player 136, they are dispatched to core player 238. In step 616, new core player events are forwarded from core player 238 to reporting layer 242. Then, in step 618 new reporting events are sent from reporting layer 242 to real-time tracking collection engine 120. At this point, if it is determined that tracking interval 342 has passed, real-time tracking collection engine 120 calls optimizer 114 to optimize the reported events 125 and then calls serializer 116 to create an optimized structure 344 before creating and invoking a corresponding tracking call 346 to send events 125 to a server-side infrastructure (i.e., hosted by server 102). As shown in FIG. 6, the optimization and serialization to create optimized structure 344, and subsequent invocation of a tracking call 346 is iteratively repeated to send events to server 102 in accordance with the tracking interval 342.

Exemplary User Interface and Reports

FIG. 7 illustrates an exemplary user interface (UI) and reports, according to embodiments of the present disclosure. The UI depicted in FIG. 7 is described with reference to the embodiments of FIGS. 1-3, 5 and 6. However, the UI is not limited to those example embodiments. In an embodiment, the live video analytics and real-time video interfaces for network administrators (i.e., administrators of network 106 and/or CDN 104), publishers, advertisers, and marketing/analyst teams are implemented as the UI illustrated in FIG. 7. The UI can be displayed on client devices 134a-n on respective ones of display devices 121a-n.

In FIG. 7, a display is shown with various icons, a dashboard, controls, command regions, windows, toolbars, menus, and buttons that are used to initiate action, invoke routines, search for video assets, display metrics and event data for video assets, display metrics and event data for advertisements, or invoke other functionality. The initiated actions include, but are not limited to, searching for video content, viewing metrics and event data pertaining to playback of video content, viewing QoS metrics, and other video-related inputs.

In embodiments, a display device 121 can be used to display the user interface and reports shown in FIG. 7. The user interface (UI) may be displayed via the display interface 902 and the computer display 930 described below with reference to FIG. 9. In certain embodiments, the UIs can be configured to be displayed on a touch screen display device 121. According to embodiments, users such as a publisher, distributor, advertiser, marketing analyst, and/or a network administrator can interact with the UI shown in FIG. 7 using input devices such as, but not limited to, a stylus, a finger, a mouse, a keyboard, a keypad, a joy stick, a voice activated control system, or other input devices used to provide interaction between a user and the UI. As described below with reference to FIG. 7, such interaction can be used to indicate a video asset, audience segment, client device type, distribution channel, or advertisement break to be analyzed. The interaction can be also be used to navigate through multiple video assets 135, and to select one or more groups of video assets 135 to be analyzed.

The exemplary real-time reports and interface depicted in FIG. 7 enable users to efficiently identify success metrics for online video publishing and advertising. The user interface includes a live, real-time dashboard summarizing aggregated metrics and events 125 across multiple video assets 135 and ad assets 135. This dashboard gives real-time insight into overall audience (i.e., viewer) engagement. Although not shown in FIG. 7, by interacting with graph controls 708, list controls 709, and/or search box 718, the user interface can provide more granular reports indicating which segments of web site visitors (i.e., viewers) are watching particular video assets 135 and what events 125 are currently occurring for those assets 135.

FIG. 7 illustrates an exemplary video overview user interface 700 configured to present a summary dashboard for a group of video assets 135 as well as a navigable list including live metrics and event data for individual video assets 135 in the group. In one embodiment, network administrator and marketing users can both be provided with certain administrator privileges in tracking collection system 100 and be granted access to the video overview user interface 700 shown in FIG. 7. After providing login credentials and authenticating to the tracking collection system 100, an authorized user can launch the video overview user interface 700.

As shown in the example embodiment of FIG. 7, video overview user interface (UI) 700 can include a dashboard displaying a summary of real-time analytics data for a group of video assets 135. The dashboard can indicate total concurrent viewers 702 (i.e., total viewership indicated as a number of current users) for the group of video assets 135, total ad impressions 704 for ads included in the video assets 135, and total ad revenue 706 based on real-time data tracked and collected by tracking collection system 100. In certain non-limiting embodiments, video overview UI 700 can be periodically updated according to an interval. In the non-limiting example of FIG. 7, this refresh or update interval is 12 seconds. It is to be understood that this interval for updating data presented in FIG. 7 can be a tunable value set by a user of UI 700, or another tunable value, such as a tracking interval 342. For example, the data shown in FIG. 7 can be updated every 10 seconds in cases where the tracking interval 342 is set to 10 seconds. In an embodiment, the group of video assets 135 includes all video content currently being viewed on client devices with real-time tracking collection engines 120 configured to send events 125 to a tracking server, such as server 102. According to this embodiment, the summary dashboard of the video overview UI 700 can display or list metrics such as total viewers 702 (i.e., viewership), total ad impressions 704, and total ad revenue 706 for all video assets 135 currently being viewed in video players 136 of client devices 134 having real-time tracking collection engines 120. In additional or alternative embodiments, the group of video assets 135 are assets being viewed by one or more user-selected audience segments (i.e., groups of viewers), via one or more distribution channels, and/or on certain platforms. Platforms of interest can be indicated by selecting types of client devices 134 (i.e., desktop computers, tablet devices 134b, smartphone devices 134n) and/or certain versions of video players 136 (i.e., a version of a DailyMotion video player application). For example, by selecting segments (e.g., males having bachelor's degrees) and a platform (e.g., a tablet), a user can filter the real-time analytics data presented in the summary dashboard to a subset of interest. In one embodiment, the summary dashboard displays total viewership as a sum of concurrent viewers 702, total ad impressions as a sum of ad impressions 704, and total ad revenue 706 as a sum of ad revenue 706 for a selected group of video assets 135, where the group of assets is selected via interaction with search box 718 and/or list controls 709 shown in FIG. 7.

In the exemplary embodiment shown in FIG. 7, the video overview UI 700 includes a navigable list of video assets 135. Search box 718 can be used to search for a specific video name 722 within the list. For example, a character string representing a full or partial name 722 of a video asset 135 can be entered in search box 718 in order to find out a video name including the search string is included in the list of live videos. List controls 709 can be used to navigate to specified pages of the list and/or change the number of video assets 135 appearing on each page of the list. According to embodiments, list controls 709 can also be used to sort the list of video assets 135 by one or more analytics or QoS metrics. For example, as shown in FIG. 7, a list control 709 has been selected to sort the list of videos in descending order with respect to the average buffer rates 714 of the listed video assets 135.

Real-time analytics data collected and tracked can also be used in video overview UI 700 indicate, for each video asset 135 being viewed, concurrent viewers 712, ad impressions 704, ad revenue 706, peak viewership in terms of a peak number of distinct viewers/users, average buffering rate 714, and an average bit rate 730.

The video overview UI 700 also includes integrated QoS metrics, which are based on information pertaining to upstream origination services from video encoders, packagers, originators, and distributors such as a CDN 104. As seen in FIG. 7, the video overview UI 700 also includes, which can indicate changes in stream quality, bandwidth, and drop-offs, so that network administrators and network operators can troubleshoot issues as they arise in near real-time in order to reduce the likelihood of performance problems in advance. The video overview UI 700 provides a seamless, integrated UI that allows live QoS metrics to be evaluated in real-time by network operators and administrators alongside tracked events 125 and analytics data. In embodiments, the tracked data presented in video overview UI 700 is made simultaneously available to analytics modules and systems, such as, for example, analytics module 108 and Adobe® Analytics. According to these embodiments historical analysis can be performed within an integrated data platform including both real-time and historical data that is seamlessly available to network operations staff and marketing/analyst teams.

In the example embodiment illustrated in FIG. 7, for a given video asset 135, graphs 712, 724, and 726 are displayed indicating total viewers 702, average buffer rate 714, and bit rate threshold 716 percentages, respectively, at different points in time. In addition to historical data, graphs 712, 724, and 726 indicate a current value for total concurrent viewers 702, an average buffer rate 714, and a bit rate threshold 716 percentage. As shown, graph controls 708 can be used to alter the time range shown in graphs 712, 724, and 726 and to select different real-time analytics data and metrics to be graphically displayed. As shown in FIG. 7, graph controls 708 include a drop down menu to select a time range (i.e., 'Previous 45 minutes') and icons to select metrics to be displayed. While graphs 712, 724 and 726 plot total viewers 702, average buffer rate 714, and bit rate threshold 716, it is to be understood that by using graph controls 708, any of the real-time analytics data items and metrics displayed in FIG. 7 can be selected to be graphically depicted in UI 700.

As shown, UI 700 can include a summary dashboard listing metrics such as, but not limited to, total concurrent viewers 702, ad impressions 704, ad revenue 706. In additional or alternative embodiments, UI 700 can display other dashboard metrics such as average error rate, peak viewership, ad density, average buffering rate 714, and a bit rate threshold 716. In an embodiment, the data displayed in the dashboard is for video assets 135 satisfying filters set via interaction with graph controls 708. In certain embodiments, graph controls 708 can include UI elements such as slider controls, drop down menus, and/or icons to filter videos by length, genre, devices, segments (i.e., audience segments), geographic locations/regions, and dates. The dashboard of can also display viewership changes adjacent to the number of concurrent viewers 702 in relation to increases and decreases in viewership.

In additional or alternative embodiments, UI 700 can include a thumbnail (not shown) corresponding to a live presentation of a particular video asset 135. In alternative or additional embodiments, the dashboard can display a thumbnail including at least one frame of the video asset 135, and can optionally be implemented as a live, animated icon that changes over time (i.e., is not static). One type of animated icon displays a sequence of frames from the video asset (i.e., as a slide show). In some embodiments, animation of an animated icon does not necessarily require user interaction or user stimulus and the animation occurs on its own. For example, the thumbnail can be configured to play (e.g., once or repeatedly) at least some portion of its associated video content. In one embodiment, different points in time or snapshots of the video content are shown in the thumbnail. In various embodiments, animation is triggered or activated by an input device or mouse rollover (i.e., having a mouse, stylus, finger or other input device hover over or near the thumbnail without necessarily clicking on or selecting the thumbnail). In some embodiments, an animation plays only once in response to detecting a rollover or hover. In alternative or additional embodiments, the video content is played or looped until the rollover or hovering ends (i.e., the cursor, pointer or input focus is no longer hovering over or near the thumbnail).

Although not shown in exemplary UI 700, in alternative or additional embodiments, a panel, pane, list or window of UI 700 can also include list of ad breaks for a given video asset. The ad breaks can be identified by name and temporal locations within the video asset (e.g., 'Ad Break One 0:15:45-0:17:30'). Data for each defined ad break can be displayed in the list. Exemplary ad break data includes, for each ad break, a number of unique ad assets 135 shown during the ad break, a number of impressions 704, and revenue 706.

The exemplary UI 700 can display information regarding audience segments, viewing devices (i.e., viewing platforms), channels, and referrers for a given video asset 135. In one non-limiting example, the information shown in FIG. 7 can be filtered by one or more audience segments in terms of gender (e.g., male or female), income (i.e., visitors having or exceeding a certain income), education level (i.e., visitors having obtained a bachelor's degree), and other segments of visitors or users of video content. While not shown in FIG. 7, it is to be understood that analytics and metrics regarding numbers of visitors can be filtered according to visitors using various types of client devices 134 and viewing platforms such as desktop computers, tablet client devices 134*b*, smartphones 134*n*, and other client devices 134. Similarly, the distribution of visitors across channels can be shown in UI 700 in terms of specific web sites and social media platforms. The UI 700 can also show the distribution of visitors across different categories or types of referrers, such as, for example, direct access (i.e., no referrer), search engines, social media platforms, and other referring web sites corresponding to different categories of referrers.

Exemplary Method

FIG. 8 is a flow chart illustrating an example method 800 for tracking and collecting metrics and events. For illustrative purposes, method 800 is described with reference to the system and UI implementations depicted in FIGS. 1-3 and 5-7. Other implementations, however, are possible. For example, FIG. 8 is described from the perspective of client-side operations. In alternative or additional embodiments, such as those described above with reference to FIGS. 1, 5 and 6, real-time tracking collection can be performed using a server-side infrastructure in communication with client devices. Optional and/or additional portions of steps are indicated in the flowchart by parenthetical phrases.

The method 800 begins at optional step 802 where video content is selected for viewing. In step 802, selection of a video asset 135 is received and a request for the selected asset 135 is sent to a server, such as server 102. The request can be sent to the server via a CDN, such as CDN 104. In an embodiment, optional step 802 can be performed by receiving a selection of a video asset 135 within a UI of video player 136. This step can be performed by selecting, using an input device 130, a video asset for viewing within a display device 121 of a client device 134 having a video player 136. After the video content has been requested, control is passed to step 804.

In step 804, video content and its properties are received. If optional step 802 was performed, step 804 comprises receiving video content corresponding to the video content requested in step 802. As shown in FIG. 8, step 804 can comprise receiving a video asset 135 and associated metadata. Step 804 can comprise receiving a video asset 135, via network 106, at a video player 136 executing on a client device 134, as described above with reference to FIG. 1. For example, the video asset received in step 804 can be received from server 102 via CDN 104 and network 106 as shown in FIG. 1. After the video content is received, control is passed to step 806.

Next, in step 806, an advertisement request is generated. As shown in FIG. 8, in certain embodiments, this step can comprise sending an implicit advertisement request based at least in part on one or more of: video properties received in step 804, a user profile, properties of the user's client device 134, and properties of video player 136 running on the client device 134. In an embodiment, step 806 can result in an ad asset request 132 (i.e., an ad request) being sent to ad resolver 110 as described above with reference to FIGS. 1 and 5.

Next, in step 808, an indication of at least one ad is received in response to the ad request sent in step 806 and inserted into the video content. As shown, an ad asset 135 for a linear ad, an overlay ad, or another type of ad, such as a hypervideo ad, can be received in step 808 and then inserted into the video content received in step 804. In one embodiment, step 808 can be performed by delivering ads to a video player 136 via HyperText Markup Language 5 (HTML5), using the <video>tag or video element of HTML5. In embodiments, the ad received in step 808 was matched to the video content from step 804 by ad resolver 110 as described above with reference to FIGS. 1 and 5. In certain embodiments, the ad insertion of step 808 can be performed by an ad insertion mechanism 240 as described above with reference to FIGS. 2 and 5. In an embodiment, step 808 comprises using an ad insertion plug-in to insert ads into video content as the video content is being played. Step 808 can comprise receiving a plurality of ads. For example, if ad resolver 110 resolved the ad request sent in step 806 by matching multiple ads to the video content, these multiple ads can be retrieved in step 808 by ad insertion mechanism 240 and inserted into the video content. Performing step 808 results in creation of a rendition of the video content including the inserted ad(s). After receiving ad(s) and inserting the received ad(s) into the video content, control is passed to step 810.

In step 810, data is collected for tracked video and ad events, and the collected data is added to a list of events. According to embodiments, this step can be performed by collector 112 of the real-time tracking collection engine 120 shown in FIGS. 1 and 2. As shown in FIG. 8, this step can comprise collecting, for each tracked video and ad event, information including one or more of an event timestamp 338, an event type 340, and event data 341 such as a previous event timestamp. As events are collected in step 810, they can be added to a chained list of events 125 as described above with reference to FIG. 3. Exemplary events collected in step 810 can include, but are not limited to, video start events, video buffering events, video play events, ad start events, and ad play events. This step can also comprise collecting out-of-band events, such as, for example, error events. In an embodiment, as out-of-band events are collected in step 810, their data is sent to a server without performing steps 812-920.

In step 812, a determination is made as to whether a tracking interval has elapsed. As shown, the tracking interval can be a tunable interval. For example the tracking interval evaluated in step 812 can be tracking interval 342 described above with reference to FIG. 3 with a default value of 10 seconds. If it determined that the tracking interval has not yet elapsed, control is passed back to step 810 where real-time collection of event data continues. Otherwise, if it is determined that the tracking interval has elapsed, control is passed to step 814 where the events collected during the tracking interval are optimized.

In step 814, events collected by repeating step 810 during the tracking interval are optimized. As shown, step 814 can comprise optimizing events 125 collected within a tunable tracking interval, such as in the 10 seconds since the previous time step 814 was performed. In accordance with embodiments, step 814 can be performed by optimizer 114 described above with reference to FIGS. 1-3. After the events are optimized, control is passed to step 816.

Next, in step 816, the optimized events from step 814 are serialized to create an optimized structure or format needed by a target server. The target server can be a tracking server such as server 102 or an analytics server. As shown, step 816 can format the optimized events as URL strings usable by the target server. In embodiments, step 816 can be performed by serializer 116 described above with reference to FIGS. 1-3 in order to create an optimized structure 344. After the optimized events are serialized, control is passed to step 818.

In step 818, tracking calls corresponding to the serialized events are created and issued. By issuing or invoking the tracking calls, this step sends event data, in the optimized structure created in step 816, to the target server. As described above with reference to step 816, the target server can be a tracking server such as server 102 or a separate analytics server. As shown in FIG. 1, the target server receiving the tracked events 125 can be embodied as a server 102 hosting an analytics module 108. As seen in FIG. 8, the tracking calls sent in step 818 can be HTTP calls to such a target server. According to embodiments, step 818 can be performed by sender 118 described above with reference to FIGS. 1-3 in order to create tracking calls 346. After the tracking calls are issued, control is passed to step 820.

In step 820, a determination is made as to whether a viewing session for the video content has completed. As shown, this step can comprise determining if playback for the video content has completed, which can be a result of the video content being stopped or closed within a video player 136. This step can also determine that a viewing session has completed if the video player 136 has been closed. If it determined that the viewing session has not completed, control is passed back to step 810 where real-time collection of event data continues. Otherwise, if it is determined that the viewing session has completed, control is passed to step 822 where any final events associated with completion/termination of the viewing session are sent to the target server and method 800 ends.

Exemplary Computer System Implementation

Figure 9:
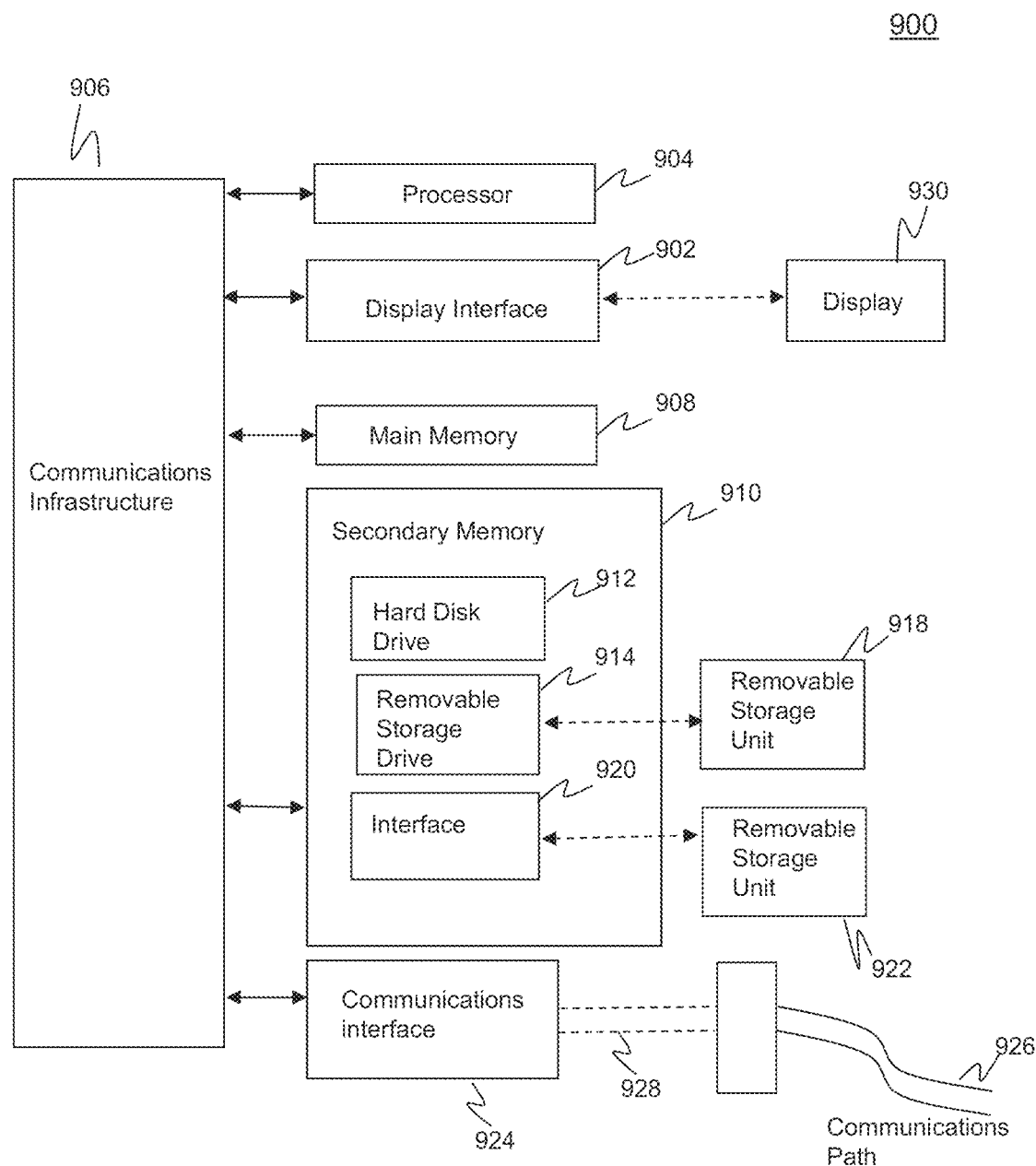
FIG. 9 is a diagram of an exemplary computer system in which embodiments of the present disclosure can be implemented.

Although exemplary embodiments have been described in terms of systems, and methods, it is contemplated that certain functionality described herein may be implemented in software on microprocessors, such as a processors 126a-n and 128 included in the client devices 134a-n and server 102, respectively, shown in FIG. 1, and computing devices such as the computer system 900 illustrated in FIG. 9. In various embodiments, one or more of the functions of the various components may be implemented in software that controls a computing device, such as computer system 900, which is described below with reference to FIG. 9.

Aspects of the present invention shown in FIG. 1-8, or any part(s) or function(s) thereof, may be implemented using hardware, software modules, firmware, tangible computer readable media having logic or instructions stored thereon, or a combination thereof and may be implemented in one or more computer systems or other processing systems.

FIG. 9 illustrates an example computer system 900 in which embodiments of the present invention, or portions thereof, may be implemented as computer-readable instructions or code. For example, some functionality performed by client devices 134a-n and server 92 shown in FIG. 1, can be implemented in the computer system 900 using hardware, software, firmware, non-transitory computer readable media having instructions stored thereon, or a combination thereof and may be implemented in one or more computer systems or other processing systems. Hardware, software, or any combination of such may embody certain modules and components used to implement steps in the method 800 illustrated by the flowchart of FIG. 8 discussed above and the user interface 700 discussed above with reference to FIG. 7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 900. After reading this description, it will become apparent to a person skilled in the relevant art how to implement the embodiments using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 904 may be a special purpose or a general-purpose processor device. As will be appreciated by persons skilled in the relevant art, processor device 904 may also be a single processor in a multi-core/multiprocessor system, such system operating alone, or in a cluster of computing devices operating in a cluster or server farm. Processor device 904 is connected to a communication infrastructure 906, for example, a bus, message queue, network, or multi-core message-passing scheme. In certain embodiments, one or more of the processors 123 and 126a-n described above with reference to tracking collection system 90, server 92, and client devices 134a-n of FIG. 1 can be embodied as the processor device 904 shown in FIG. 9.

Computer system 900 also includes a main memory 908, for example, random access memory (RAM), and may also include a secondary memory 910. Secondary memory 910 may include, for example, a hard disk drive 912, removable storage drive 914. Removable storage drive 914 may comprise a magnetic tape drive, an optical disk drive, a flash memory, or the like. In non-limiting embodiments, one or more of the memories 124 and 128a-n described above with reference to server 92 and client devices 134a-n of FIG. 1 can be embodied as the main memory 908 shown in FIG. 9.

The removable storage drive 914 reads from and/or writes to a removable storage unit 918 in a well-known manner. Removable storage unit 918 may comprise a magnetic tape, optical disk, etc. which is read by and written to by removable storage drive 914. As will be appreciated by persons skilled in the relevant art, removable storage unit 918 includes a non-transitory computer readable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900. In non-limiting embodiments, one or more of the memories 124 and 128a-n described above with reference to server 92 and client devices 134a-n of FIG. 1 can be embodied as the main memory 908 shown in FIG. 9.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data 928 transferred via communications interface 924 may be in the form of signals, which may be electronic, electromagnetic, optical, or other signals capable of being received by communications interface 924. These signals may be provided to communications interface 924 via a communications path 926. Communications path 926 carries signals and may be implemented using wire or cable, fiber optics, a phone line, a cellular phone link, an RF link or other communications channels.

As used herein, the terms "computer readable medium" and "non-transitory computer readable medium" are used to generally refer to media such as memories, such as main memory 908 and secondary memory 910, which can be memory semiconductors (e.g., DRAMs, etc.). Computer readable medium and non-transitory computer readable medium can also refer to removable storage unit 918, removable storage unit 922, and a hard disk installed in hard disk drive 912. Signals carried over communications path 926 can also embody the logic described herein. These computer program products are means for providing software to computer system 900. A computer-readable medium may comprise, but is not limited to, an electronic, optical, magnetic, or other storage device capable of providing a processor with computer-readable instructions. Other examples comprise, but are not limited to, a floppy disk, a CD-ROM, a DVD, a magnetic disk, a memory chip, ROM, RAM, an ASIC, a configured processor, optical storage, magnetic tape or other magnetic storage, or any other medium from which a processor such as processors 123 and processors 126a-n shown in FIG. 1, or processor device 904 can read instructions. The instructions may comprise processor-specific instructions generated by a compiler and/or an interpreter from code written in any suitable computer-programming language. Non-limiting examples of a suitable programming language can include C, C++, C#, Visual Basic, Java, Python, Perl, JavaScript, and ActionScript.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor device 904 to implement the processes of the present invention, such as the steps in the method 800 illustrated by the flowchart of FIG. 8 discussed above. Accordingly, such computer programs represent controllers of the computer system 900. Where an embodiment of the invention is implemented using software, the software may be stored in a computer program product and loaded into computer system 900 using removable storage drive 914, interface 920, and hard disk drive 912, or communications interface 924.

In an embodiment, the display devices 121a-n used to display interfaces of video player 136, video overview UI 700, a publisher UI, and/or an advertiser UI, may be a computer display 930 shown in FIG. 9. The computer display 930 of computer system 900 can be implemented as a touch sensitive display (i.e., a touch screen). Similarly, the user interface shown in FIG. 7 may be embodied as a display interface 902 shown in FIG. 9.

Embodiments of the invention also may be directed to computer program products comprising software stored on any computer readable medium. Such software, when executed in one or more data processing device, causes a data processing device(s) to operate as described herein. Embodiments employ any computer readable medium. Examples of computer useable mediums include, but are not limited to, primary storage devices (e.g., any type of random access memory), secondary storage devices (e.g., hard drives, floppy disks, CD ROMs, DVDs, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing device memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the steps presented in the examples above can be varied—for example, steps can be re-ordered, combined, and/or broken into sub-steps. Certain steps or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computer-implemented method for real-time tracking of events associated with use of video content, the method comprising:
collecting, by a tracking collection system, event data for a plurality of events associated with a rendition of the video content at a computing device, the rendition of the video content including one or more advertisements, wherein the event data includes an advertisement event type comprising a measurement of user interaction with the one or more advertisements in the rendition of the video content, a playback event type comprising playback data describing the rendition of the video content at the computing device, and a quality event type comprising quality-of-service data for the rendition of the video content at the computing device;
determining, by the tracking collection system, that a defined tracking interval has passed, wherein multiple tracking intervals pass during the same rendition of the video content; and
in response to determining that the defined tracking interval has passed:
optimizing, by an optimizer of the tracking collection system, the collected event data by grouping a first set of events having the advertisement event type and similar event data into a first common data item, grouping a second set of events having the playback event type and similar event data into a second common data item, and grouping a third set of events having the quality event type and similar event data into third common data item;
serializing, by a serializer of the tracking collection system, the optimized event data by structuring the optimized event data in a defined format for sending, in a common transmission for the defined tracking interval, the first common data item, the second common data item, and the third common data item; and
creating, by the tracking collection system, a tracking call capable of sending the serialized event data to a tracking server remote from the computing device.

2. The method of claim 1, further comprising:
sending, by a sender of the tracking collection system, the serialized event data to the tracking server by invoking the tracking call; and
repeating the collecting and the determining while the rendition of the video content is in use at the computing device.

3. The method of claim 1, wherein the one or more advertisements is an item of electronic content including one or more of text, image, hypervideo, and multimedia content.

4. The method of claim 1, wherein the collected event data comprises, for each of the plurality of events, one or more of an event timestamp, an event type, and a previous event timestamp, the previous event timestamp representing a most-recent event timestamp for a prior event having a similar event type.

5. The method of claim 4, wherein the advertisement event type is one or more of an ad start event and an ad play event, wherein the second event type is one or more of a video start event and a video play event, wherein the quality event type is one or more of a video buffering event, and a bitrate change event.

6. The method of claim 1, wherein the tracking call is formatted as a hypertext transfer protocol call.

7. The method of claim 1, wherein the defined tracking interval is a tunable interval set to a default value of 9 seconds.

8. A tracking collection system comprising:
a tracking server comprising a processor and a memory having executable instructions stored thereon, that, when executed by the processor, cause the tracking server to perform operations for tracking events associated with use of video content, the operations comprising:
determining setup parameters for a tracking collection engine implemented on a client computing device that is remote from the tracking server, the setup parameters comprising an error tracking parameter, a setup check interval, and a tracking interval, wherein the tracking collection engine comprises:
a collector module capable of collecting event data for a plurality of events associated with a rendition of the video content at the client computing device, the rendition of the video content including one or more advertisements, wherein the event data includes an advertisement event type comprising a measurement of user interaction with the one or more advertisements in the rendition of the video content, a playback event type comprising playback data describing the rendition of the video content, and a quality event type comprising quality-of-service data for the rendition of the video content,
an optimizer module capable of optimizing, in response to the defined tracking interval having passed, the collected event data by grouping a first set of events having the advertisement event type and similar event data into a first common data item, grouping a second set of events having the playback event type and similar event data into a second common data item, and grouping a third set of events having the quality event type and similar event data into third common data item,
a serializer module capable of serializing the optimized event data by structuring the optimized event data in a defined format for sending, in a common transmission for the defined tracking interval, the first common data item, the second common data item, and the third common data item, and
a sender module capable of creating and invoking a tracking call capable of sending the serialized event data to the tracking server, and
periodically receiving serialized event data from the sender module in accordance with the defined tracking interval.

9. The tracking collection system of claim 8, wherein the serialized event data comprises, for each of a plurality of tracked events, one or more of an event timestamp, an event type, and a previous event timestamp, the previous event timestamp representing a most-recent event timestamp for a prior event having a similar event type.

10. The tracking collection system of claim 8, wherein the periodically receiving the serialized event data comprises periodically receiving the tracking call from the sender module of the client computing device, the tracking call being formatted as a hypertext transfer protocol call.

11. The tracking collection system of claim 8, wherein the use of the video content comprises the playback of the rendition of the video content in a video player executing on the client computing device,
wherein the tracking server is further configured for collecting the serialized event data in real-time and contemporaneously with occurrences tracked events associated with the playback of the rendition of the video content.

12. The tracking collection system of claim 8, wherein the tracking collection system further comprises a display device communicatively coupled to the tracking server, wherein the operations further comprise:
storing the serialized event data in the memory or another memory;
repeatedly receiving the serialized content while the video content is in use at the client computing device;
presenting, in an interactive user interface on the display device, data representing (i) at least a portion of the serialized event data and (ii) analytics data related to the serialized event data,
wherein determining the setup parameters comprises iteratively querying the client computing device in accordance with the setup check interval to determine current setup parameters for the tracking collection engine.

13. The tracking collection system of claim 8, wherein the tracking server is communicatively coupled to an input device of the tracking collection system and a display device of the tracking collection system, wherein the operations further comprise:
displaying, in an administrator user interface on the display device, the setup parameters; and
in response to receiving, in the administrator user interface, via the input device, an update to one or more of the setup parameters, sending the updated one or more setup parameters to the tracking collection engine.

14. A non-transitory computer-readable storage medium having executable instructions stored thereon, that, if executed by a processing device, cause the processing device to perform operations for real-time tracking of events associated with use of video content, the operations comprising:
collecting event data for a plurality of events associated with a rendition of the video content at a computing device, the rendition of the video content including one or more advertisements, wherein the event data includes an advertisement event type comprising a measurement of user interaction with the one or more advertisements in the rendition of the video content, a playback event type comprising playback data describing the rendition of the video content, and a quality event type comprising quality-of-service data for the rendition of the video content;
determining that a defined tracking interval has passed, wherein multiple tracking intervals pass during the same rendition of the video content; and
in response to determining that the defined tracking interval has passed:
optimizing the collected event data by grouping a first set of events having the advertisement event type and similar event data into a first common data item, grouping a second set of events having the playback event type and similar event data into a second common data item, and grouping a third set of events having the quality event type and similar event data into third common data item;
serializing the optimized event data by structuring the optimized event data in a defined format for sending, in a common transmission for the defined tracking interval, the first common data item, the second common data item, and the third common data item; and
creating a tracking call capable of sending the serialized event data to a tracking server remote from the computing device.

15. The non-transitory computer-readable storage medium of claim 14, the operations further comprising:
storing the collected event data in the non-transitory computer readable storage medium or another non-transitory computer-readable medium;
sending the serialized event data to the tracking server by issuing the tracking call; and
repeating the collecting and the determining in real-time while the rendition of the video content is in use at the computing device.

16. The method of claim 1, further comprising:
detecting, by the tracking collection system, an error event; and
transmitting the error event from the tracking collection system to the tracking server, wherein the error event is detected and transmitted during the defined tracking interval and before the defined tracking interval has completed.

17. The method of claim 1, wherein collecting the event data comprises:
generating first event data for a first subset of events from the plurality of events, wherein:
(i) the first event data comprises, for each event in the first subset of events, a respective timestamp for the event and a first event description having the advertisement event type, and
(ii) the first event data further comprises, for one or more events in the first subset of events, first relationship data identifying a similarity between (a) one or more events in the first subset of events and (b) one or more additional events in the first subset of events,
generating second event data for a second subset of events from the plurality of events, wherein:
(i) the second event data comprises, for each event in the second subset of events, a respective timestamp for the event and a second event description having the playback event type, and
(ii) the second event data further comprises, for one or more events in the second subset of events, second relationship data identifying a similarity between (a) one or more events in the second subset of events and (b) one or more additional events in the second subset of events, and
generating third event data for a third subset of events from the plurality of events, wherein:
(i) the third event data comprises, for each event in the third subset of events, a respective timestamp for the event and a third event description having the quality event type, and
(ii) the third event data further comprises, for one or more events in the third subset of events, third relationship data identifying a similarity between (a)

one or more events in the third subset of events and (b) one or more additional events in the third subset of events.

18. The method of claim 17, wherein the first subset of events, the second subset of events, and the third subset of events are selected for the optimization based on the defined tracking interval corresponding to the timestamps in the first event data, the second event data, and the third event data, wherein optimizing the collected event data comprises one or more of:
grouping the first set of events into the first common data item by performing first operations comprising:
generating the first common data item having a first asset information data structure and a first event information data structure,
updating the first asset information data structure to include one or more of an advertisement identifier and a cost per impression, and
updating the first event information data structure to include the advertisement event type and to include a first event count, wherein the first event count is identified based on the first relationship data and indicates a number of events in the first subset of events having the first event description,
grouping the second set of events having the playback event type into the second common data item by performing second operations comprising:
generating the second common data item having a second asset information data structure and a second event information data structure,
updating the second asset information data structure to include one or more of a video publisher and a video identifier, and
updating the second event information data structure to include the playback event type and to include a second event count, wherein the second event count is identified based on the second relationship data and indicates a number of events in the second subset of events having the second event description, and
grouping the third set of events having the quality event type into the third common data item by performing third operations comprising:
generating the third common data item having a third event information data structure, and
updating the third event information data structure to include the quality event type and to include a third event count, wherein the third event count is identified based on the third relationship data and indicates a number of events in the third subset of events having the third event description.

19. The method of claim 18, wherein optimizing the collected event data comprises performing the first operations, the second operations, and the third operations.

20. The method of claim 19, wherein generating the first event description having the advertisement event type comprises (i) accessing a list of one or more first event identifiers, the first event identifiers respectively indicating an ad start event and an ad complete event, and (ii) selecting an event identifier from the list of first event identifiers;
wherein generating the second event description having the playback event type comprises (i) accessing a list of three or more second event identifiers, the second event identifiers respectively indicating a video play event, a video pause event, a video stop event, a video complete event, a video close event, and a time played event, and (ii) selecting an event identifier from the list of three or more second event identifiers;
wherein generating the third event description having the quality event type comprises (i) accessing a list of two or more third event identifiers, the third event identifiers respectively indicating a buffering start event, a buffering end event, and a bitrate change event, and (ii) selecting an event identifier from the list of two or more third event identifiers.

* * * * *